United States Patent
Hur et al.

(10) Patent No.: US 12,003,769 B2
(45) Date of Patent: Jun. 4, 2024

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/842,082

(22) Filed: Jun. 16, 2022

(65) Prior Publication Data

US 2022/0321914 A1    Oct. 6, 2022

Related U.S. Application Data

(63) Continuation of application No. 17/104,694, filed on Nov. 25, 2020, now Pat. No. 11,395,004.

(60) Provisional application No. 62/961,659, filed on Jan. 15, 2020, provisional application No. 62/958,259, filed on Jan. 7, 2020.

(51) Int. Cl.
    *H04N 19/597* (2014.01)

(52) U.S. Cl.
    CPC .................. *H04N 19/597* (2014.11)

(58) Field of Classification Search
    CPC .... H04N 19/597; H04N 19/96; H04N 19/184; H04N 19/70; G06T 9/001; G06T 9/40; G06T 2207/10028
    See application file for complete search history.

(56) References Cited

U.S. PATENT DOCUMENTS

| | | |
|---|---|---|
| 7,940,279 B2 | 5/2011 | Pack |
| 8,731,313 B2 | 5/2014 | Thiyanaratnam et al. |
| 2008/0238919 A1 | 10/2008 | Pack |
| 2012/0176381 A1 | 7/2012 | Park et al. |
| 2013/0114910 A1 | 5/2013 | Mammou et al. |
| 2018/0075622 A1 | 3/2018 | Tuffreau et al. |
| 2019/0080483 A1 | 3/2019 | Mammou et al. |
| 2019/0114808 A1 | 4/2019 | Vosoughi et al. |
| 2019/0122393 A1 | 4/2019 | Sinharoy et al. |
| 2019/0311501 A1 | 10/2019 | Mammou et al. |
| 2019/0311502 A1 | 10/2019 | Mammou et al. |
| 2019/0355152 A1 | 11/2019 | Li et al. |
| 2020/0250857 A1 | 8/2020 | Nakagami et al. |

(Continued)

FOREIGN PATENT DOCUMENTS

| | | |
|---|---|---|
| CN | 109196559 | 1/2019 |
| EP | 3405928 | 11/2018 |

(Continued)

OTHER PUBLICATIONS

Extended Search Report in European Appln. No. 20912067.4, dated Dec. 5, 2022, 6 pages.

(Continued)

*Primary Examiner* — Mekonen T Bekele
(74) *Attorney, Agent, or Firm* — Fish & Richardson P.C.

(57) ABSTRACT

Disclosed herein are a point cloud data transmission method including encoding point cloud data, and transmitting a bitstream containing the point cloud data, and a point cloud data reception method including receiving a bitstream containing point cloud data, and decoding the point cloud data.

8 Claims, 35 Drawing Sheets

(56) References Cited

U.S. PATENT DOCUMENTS

| | | | |
|---|---|---|---|
| 2020/0304792 | A1 | 9/2020 | Zaghetto et al. |
| 2020/0394450 | A1 | 12/2020 | Li et al. |
| 2021/0012538 | A1 | 1/2021 | Wang et al. |
| 2021/0056732 | A1* | 2/2021 | Han .................. H04L 65/70 |
| 2021/0090263 | A1 | 3/2021 | Liu et al. |
| 2021/0233278 | A1 | 7/2021 | Kuma et al. |

FOREIGN PATENT DOCUMENTS

| | | | |
|---|---|---|---|
| EP | 3554082 | | 10/2019 |
| KR | 20180087348 | | 8/2018 |
| WO | WO2019011634 | | 1/2019 |
| WO | WO 2019011917 | | 1/2019 |
| WO | WO2019070830 | | 4/2019 |
| WO | WO-2019216434 | A1 * 11/2019 .............. G06T 3/40 |
| WO | WO2020005363 | | 1/2020 |
| WO | WO2020005364 | | 1/2020 |
| WO | WO2020005365 | | 1/2020 |
| WO | WO2019065297 | | 11/2020 |

OTHER PUBLICATIONS

3DG, "G-PCC codec description v2," International Organization For Standardization Organisation Internationale De Normalisationm, Coding of Moving Pictures and Audio, ISO/IECJTC1/SC29/WG11, N18189, Marrakech, MA, dated Jan. 2019, 40 pages.

'Common Test Conditions for PCC', ISO/IEC JCT 1/SC 29/WG 11, N18883(Dec. 6, 2019), See Abstract, Section 4.3. and 4.4. (Year: 2019).

'G-PCC codec description', ISO/IEC JCT 1/SC 29/WG 11, N18891(Dec. 18, 2019), See Section 3.2. and 3.7.-3.11. (Year: 2019).

'G-PCC Future Enhancements', ISO/IEC JCT 1/SC 29/WG 11, N18887, (Dec. 13, 2019), See Abstract, Section 3.2. and 8. (Year:2019).

'G-PCC Test Model v8', ISO/IEC JCT 1/SC 29/WG 11, N18882, (Dec. 6, 2019), See Abstract, Section 4 and 5. (Year: 2019).

Huang et al., "Octree-Based Progressive Geometry Coding of Point Clouds," Eurographics Symposium on Point-Based Graphics, Jul. 2006, 8 pages.

Kathariya et al. (hereafter Biren dra), "Scalable Point Cloud Geometry Coding With Binary Tree Embedded Quadtree", 2018 IEEE, published 2018 (Year: 2018).

Klein, "Octree-based Point-Cloud Compression," Eurographics Symposium on Point-Based Graphics, Jul. 2006, 11 pages.

Mammou et al., "G-PCC codec description v2" published on Jan. 2019. (Year: 2019).

PCT International Search Report and Written Opinion in International Appln. No. PCT/KR2020/015138, dated Feb. 18, 2021, 18 pages (with English translation).

Sun et al., "A novel point cloud compression algorithm based on clustering," IEEE Robotics and Automation Letters, Feb. 2019, 4(2):2132-2139.

Wen et al., "Lossy geometry compression of 3d point cloud data via an adaptive octree-guided network," IEEE International Conference on Multimedia and Expo, Jul. 2020, 6 pages.

Dricot, "Hybrid Octree-Plane Point Cloud Geometry Coding, " In 2019 27th European Signal Processing Conference (EUSIPCO), Sep. 2, 2019, 7 pages.

Office Action in Chinese Appln. No. 202080091844.5, dated Apr. 15, 2023, 14 pages (with English translation).

Office Action in Japanese Appln. No. 2022-541851, dated Jul. 4, 2023, 19 pages (with English translation).

ISO/IEC JTC 1/SC 29/WG7, "Insert Document," ISO/IEC JTC 1/SC 29/WG 7, MPEG 3D Graphics Coding Convenorship: AFNOR (France), N0011, Dec. 31, 2020, 148 pages.

* cited by examiner

FIG. 6
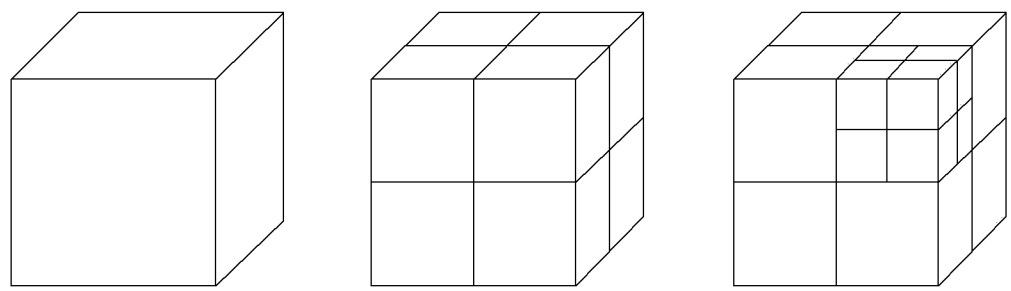
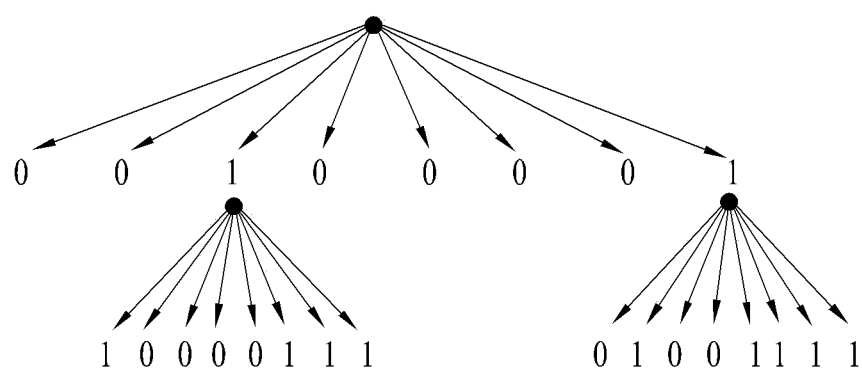

FIG. 7
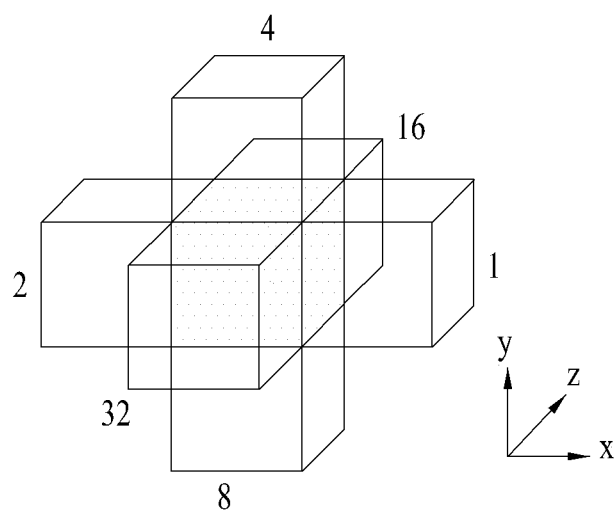
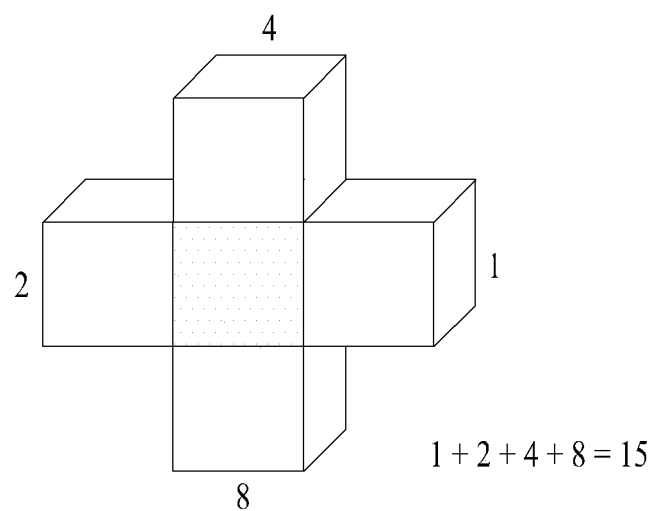
1 + 2 + 4 + 8 = 15

FIG. 25

| seq_parameter_set_rbsp( ) { | Descriptor |
|---|---|
|    profile_idc | u(8) |
|    profile_compatibility_flags | u(24) |
|    ... | |
|    sps_num_attribute_sets | ue(v) |
|    for( i = 0; i< sps_num_attribute_sets; i++ ) { | |
|       attribute_dimension[ i ] | ue(v) |
|       attribute_instance_id[ i ] | ue(v) |
|       ... | |
|       spatial_scalability_LOD | u(24) |
|       spatial_scalability_geom_quantization_type | u(2) |
|       spatial_scalability_geom_position_type | u(4) |
|       if (spatial_scalability_geom_position_type == 10) { | |
|          spatial_scalability_geom_centroid_position_type | u(4) |
|       } | |
|    } | |
|    ... | |
| byte_alignment( ) | |

FIG. 26

| geometry_parameter_set_rbsp( ) { | Descriptor |
|---|---|
|     gps_geom_parameter_set_id | ue(v) |
|     gps_seq_parameter_set_id | ue(v) |
|     ... | |
|     spatial_scalability_LOD | u(24) |
|     spatial_scalability_geom_quantization_type | u(2) |
|     spatial_scalability_geom_position_type | u(4) |
|     if (spatial_scalability_geom_position_type == 10) { | |
|         spatial_scalability_geom_centroid_position_type | u(4) |
|     } | |
|     spatial_scalability_tile_based_geom_reconstruction_flag | u(1) |
| | |
|     ... | |
|     byte_alignment( ) | |
| } | |

FIG. 27

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| ... | |
| if (spatial_scalability_tile_based_geom_reconstruction_flag == true) { | |
| spatial_scalability_LOD | u(24) |
| spatial_scalability_geom_quantization_type | u(2) |
| spatial_scalability_geom_position_type | u(4) |
| if (spatial_scalability_geom_position_type == 10) { | |
| spatial_scalability_geom_centroid_position_type | u(4) |
| } | |
| spatial_scalability_slice_based_geom_reconstruction_flag | u(1) |
| } | |
| ... | |
| } | |
| byte_alignment( ) | |
| } | |

FIG. 28

| geometry_slice_header( ) { | Descriptor |
|---|---|
|     gsh_geometry_parameter_set_id | ue(v) |
|     gsh_tile_id | ue(v) |
|     gsh_slice_id | ue(v) |
|     ... | |
|         if (spatial_scalability_slice_based_geom_reconstruction_flag == true) { | |
|             spatial_scalability_LOD | u(24) |
|             spatial_scalability_geom_quantization_type | u(2) |
|             spatial_scalability_geom_position_type | u(4) |
|             if (spatial_scalability_geom_position_type == 10) { | |
|                 spatial_scalability_geom_centroid_position_type | u(4) |
|             } | |
|         } | |
|         ... | |
|     } | |
|     byte_alignment( ) | |
| } | |

FIG. 29

| geometry_node( depth, nodeIdx, xN, yN, zN ) { | Descriptor |
|---|---|
|    if( NeighbourPattern == 0 ) { | ue(v) |
|       single_occupancy_flag | ue(v) |
|       if( single_occupancy_flag ) | ue(v) |
|    ... | |
|       if (spatial_scalability_geom_position_type == 10) { | |
|          child_occupancy_idx | ae(v) |
|       } | |
|    ... | |
|    } | |
|    byte_alignment( ) | |
| } | |

FIG. 30

| seq_parameter_set_rbsp( ) { | Descriptor |
|---|---|
|   profile_idc | u(8) |
|   profile_compatibility_flags | u(24) |
|   ... | |
|   sps_num_attribute_sets | ue(v) |
|   for( i = 0; i< sps_num_attribute_sets; i++ ) { | |
|     attribute_dimension[ i ] | ue(v) |
|     attribute_instance_id[ i ] | ue(v) |
|     ... | |
|   spatial_scalability_LOD | u(24) |
|   spatial_scalability_geom_quantization_type | u(2) |
|   spatial_scalability_geom_position_type | u(4) |
|   if (spatial_scalability_geom_position_type == 10) { | |
|     spatial_scalability_geom_centroid_position_type | u(4) |
|   } | |
|   octree_height | u(24) |
|   for (i=0; i < octree_height; i++) { | |
|     analyzed_distribution_at_depth[i] | u(4) |
|   } | |
|   } | |
|   ... | |
|   byte_alignment( ) | |
| } | |

FIG. 31

| geometry_parameter_set_rbsp( ) { | Descriptor |
|---|---|
|     gps_geom_parameter_set_id | ue(v) |
|     gps_seq_parameter_set_id | ue(v) |
|     ... | |
|     spatial_scalability_per_LOD_flag | u(1) |
|     spatial_scalability_LOD | u(24) |
|     spatial_scalability_geom_quantization_type | u(2) |
|     if (spatial_scalability_per_LOD_flag == false) { | |
|         spatial_scalability_geom_position_type | u(4) |
|         if (spatial_scalability_geom_position_type == 10) { | |
|             spatial_scalability_geom_centroid_position_type | u(4) |
|         } | |
|     } else { | |
|         octree_height | u(24) |
|         for (i=0; i < octree_height; i++) { | |
|             spatial_scalability_geom_position_type[i] | u(4) |
|             if (spatial_scalability_geom_position_type[i] == 10) { | |
|                 spatial_scalability_geom_centroid_position_type[i] | u(4) |
|             } | |
|         } | |
|     } | |
|     spatial_scalability_tile_based_geom_reconstruction_flag | u(1) |
| | |
|     ... | |
|     byte_alignment( ) | |
| } | |

FIG. 32

| tile_parameter_set( ) { | Descriptor |
|---|---|
|   num_tiles | ue(v) |
|   for( i = 0; i < num_tiles; i++ ) { | |
|     tile_bounding_box_offset_x[ i ] | se(v) |
|     tile_bounding_box_offset_y[ i ] | se(v) |
|     ... | |
|     if (spatial_scalability_tile_based_geom_reconstruction_flag == true) { | |
|       spatial_scalability_LOD | u(24) |
|       spatial_scalability_geom_quantization_type | u(2) |
|       spatial_scalability_per_LOD_flag | u(1) |
|       if (spatial_scalability_per_LOD_flag == false) { | |
|         spatial_scalability_geom_position_type | u(4) |
|         if (spatial_scalability_geom_position_type == 10) { | |
|           spatial_scalability_geom_centroid_position_type | u(4) |
|         } | |
|         spatial_scalability_slice_based_geom_reconstruction_flag | u(1) |
|       } else { | |
|         octree_height | u(24) |
|         for (i=0; i < octree_height; i++) { | |
|           spatial_scalability_geom_position_type[i] | |
|           if (spatial_scalability_geom_position_type[i] == 10) { | |
|             spatial_scalability_geom_centroid_position_type[i] | |
|           } | |
|           spatial_scalability_slice_based_geom_reconstruction_flag[i] | |
|         } | |
|       } | |
|     } | |
|     ... | |
|   } | |
|   byte_alignment( ) | |
| } | |

FIG. 33

| geometry_slice_header( ) { | Descriptor |
|---|---|
|   gsh_geometry_parameter_set_id | ue(v) |
|   gsh_tile_id | ue(v) |
|   gsh_slice_id | ue(v) |
|   ... | |
|     if (spatial_scalability_slice_based_geom_reconstruction_flag == true) { | |
|       spatial_scalability_LOD | u(24) |
|       spatial_scalability_geom_quantization_type | u(2) |
|       spatial_scalability_per_LOD_flag | u(1) |
|       if (spatial_scalability_per_LOD_flag == false) { | |
|         spatial_scalability_geom_position_type | u(4) |
|         if (spatial_scalability_geom_position_type == 10) { | |
|           spatial_scalability_geom_centroid_position_type | u(4) |
|         } | |
|       } else { | |
|         octree_height | u(24) |
|         for (i=0; i < octree_height; i++) { | |
|           spatial_scalability_geom_position_type[i] | u(4) |
|           if (spatial_scalability_geom_position_type[i] == 10) { | |
|             spatial_scalability_geom_centroid_position_type[i] | u(4) |
|           } | |
|         } | |
|       } | |
|     } | |
|   ... | |
|   } | |
|   byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a continuation of U.S. application Ser. No. 17/104,694, filed on Nov. 25, 2020, which claims the benefit of priority to U.S. Provisional Application No. 62/958,259, filed on Jan. 7, 2020, and U.S. Provisional Application No. 62/961,659, filed on Jan. 15, 2020, the disclosures of which are hereby incorporated by reference as if fully set forth herein.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method for transmitting point cloud data may include encoding the point cloud data, and transmitting a bitstream containing the point cloud data. In another aspect of the present disclosure, a method for receiving point cloud data may include receiving a bitstream containing the point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 25 shows a sequence parameter set (SPS) according to embodiments;

FIG. 26 shows a geometry parameter set (GPS) according to embodiments;

FIG. 27 shows a tile parameter set (TPS) according to embodiments;

FIG. 28 shows a geometry slice header (GSH) according to embodiments;

FIG. 29 shows a geometry node according to embodiments;

FIG. 30 shows an SPS according to embodiments;

FIG. 31 shows a GPS according to embodiments;

FIG. 32 shows a TPS according to embodiments;

FIG. 33 shows a GSH according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
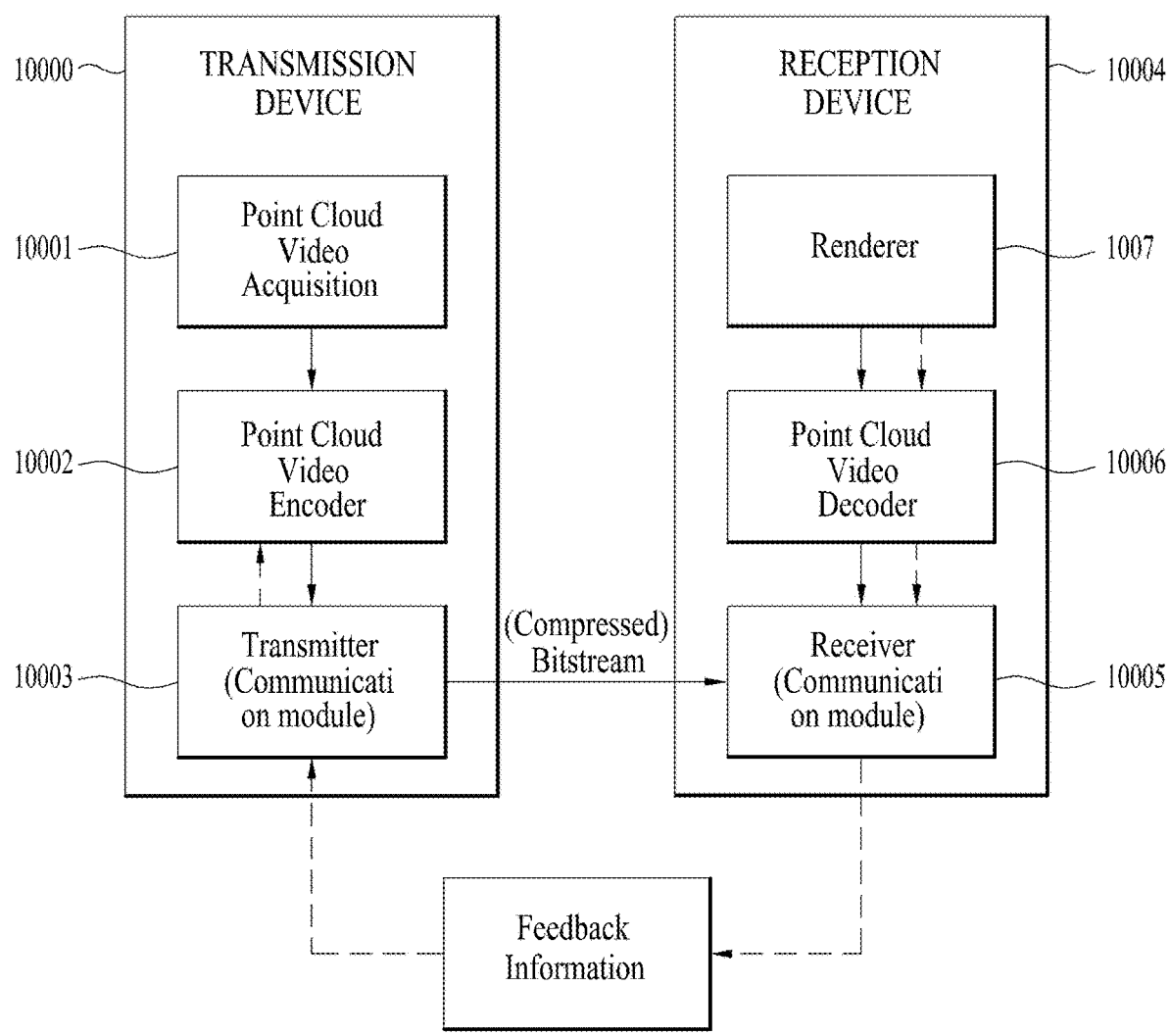
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
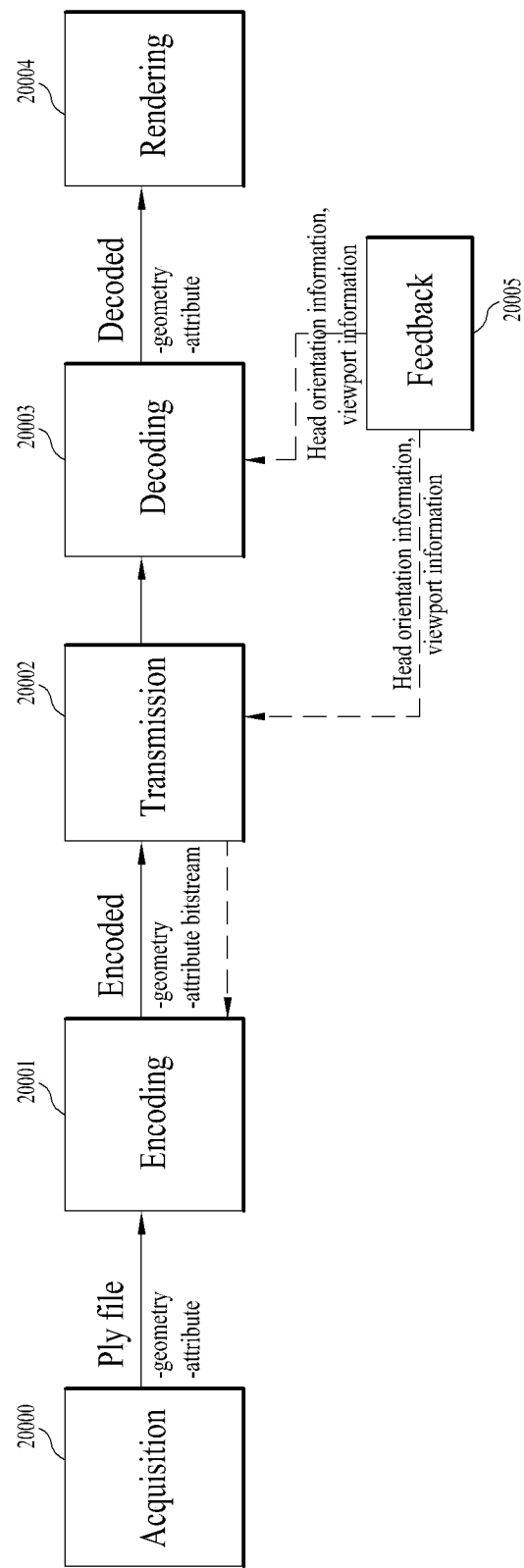
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
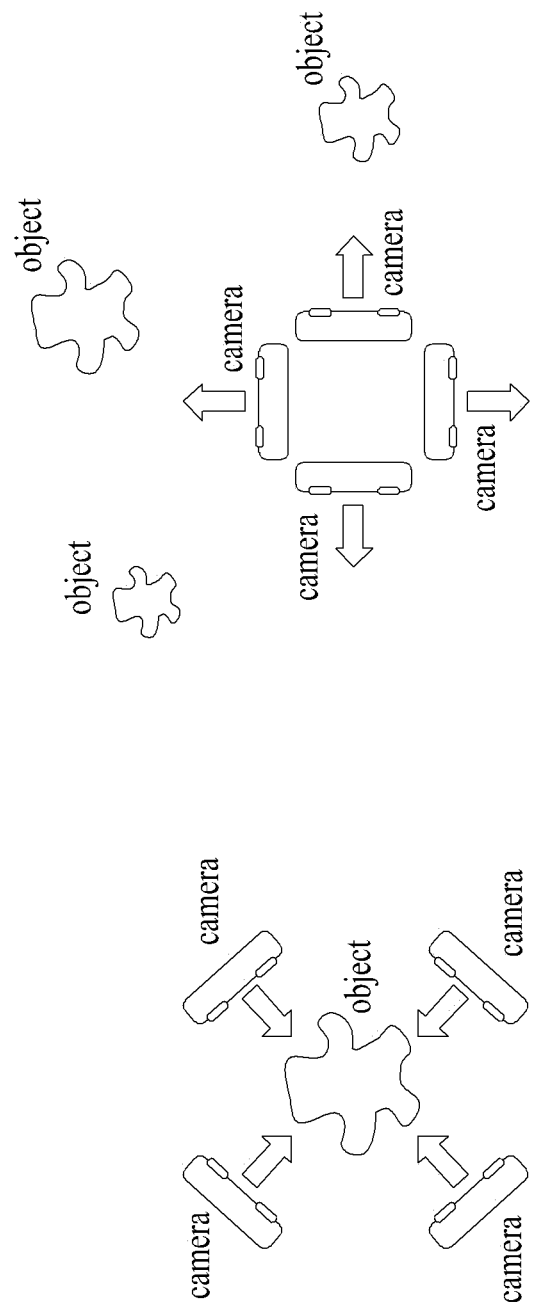
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
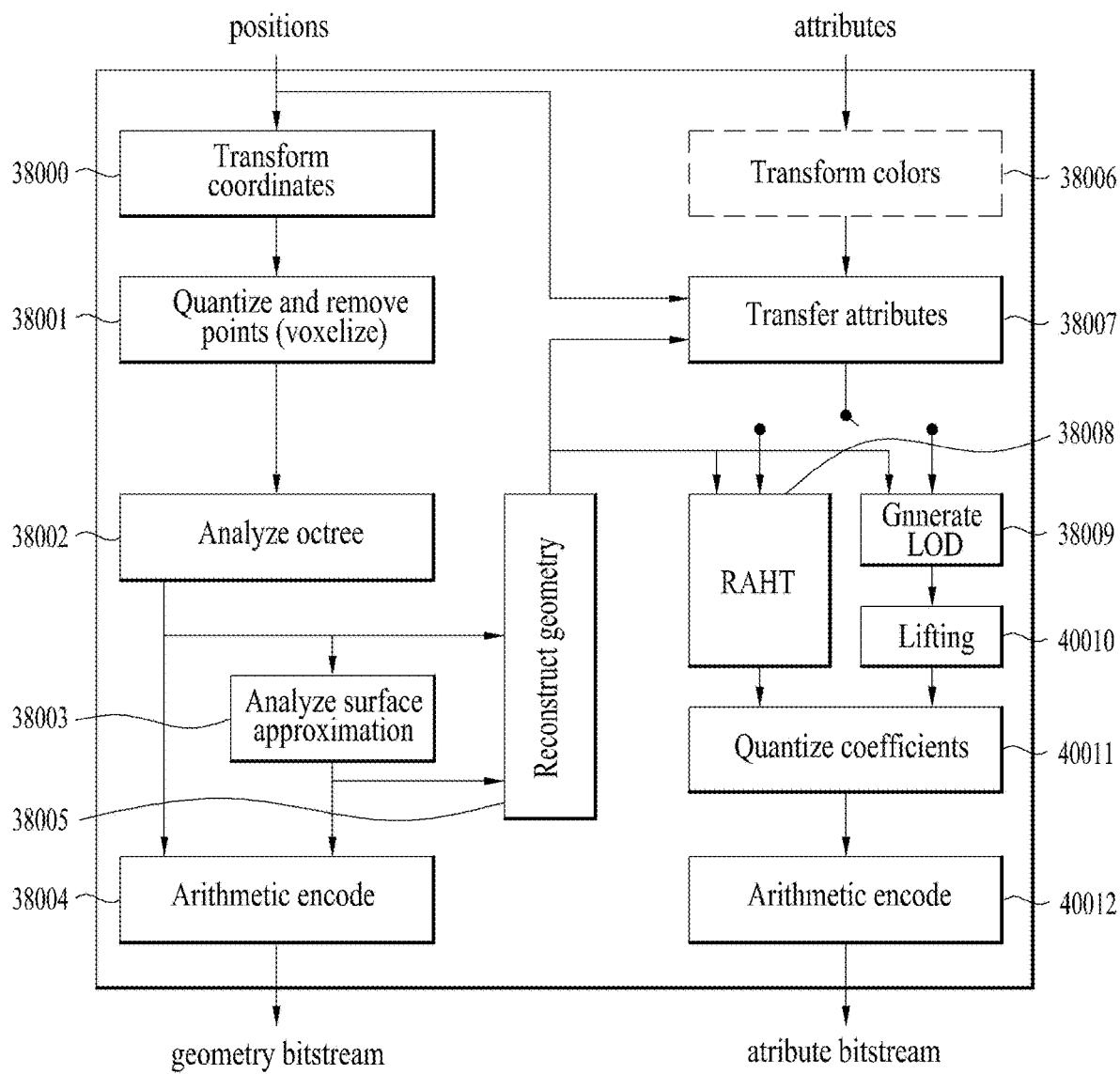
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
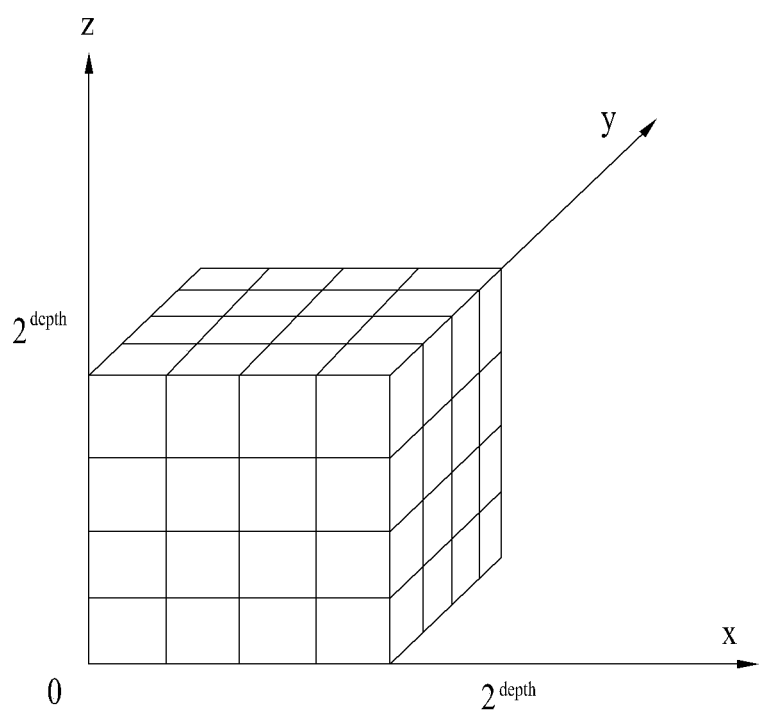
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d, 2^d, 2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n, y^{int}_n, z^{int}_n$) denotes the positions (or position values) of quantized points.

$$d=\text{Ceil}(\text{Log }2(\text{Max}(x_n^{int},y_n^{int},z_n^{int},n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
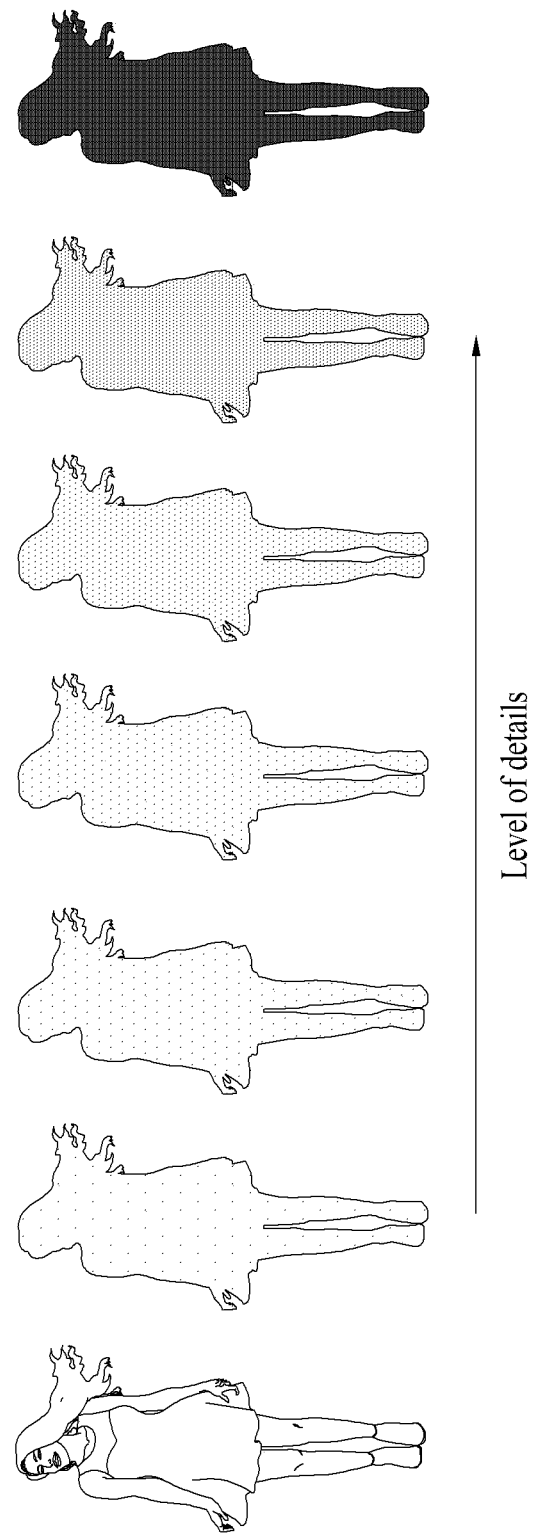
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
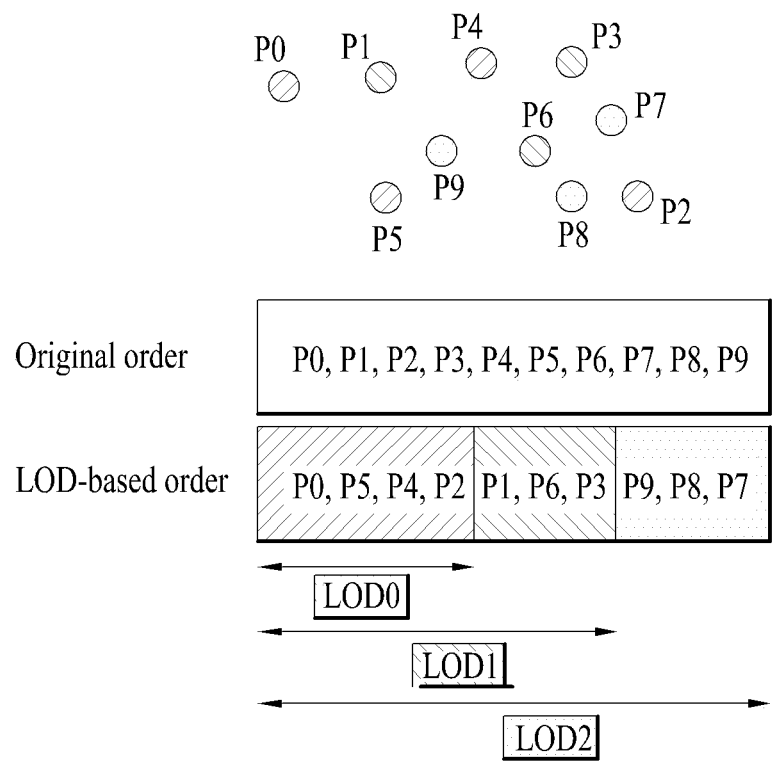
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE

Attribute prediction residuals inverse quantization pseudo code

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h0_{0,0,0} \end{bmatrix} = T_{w1000\ w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
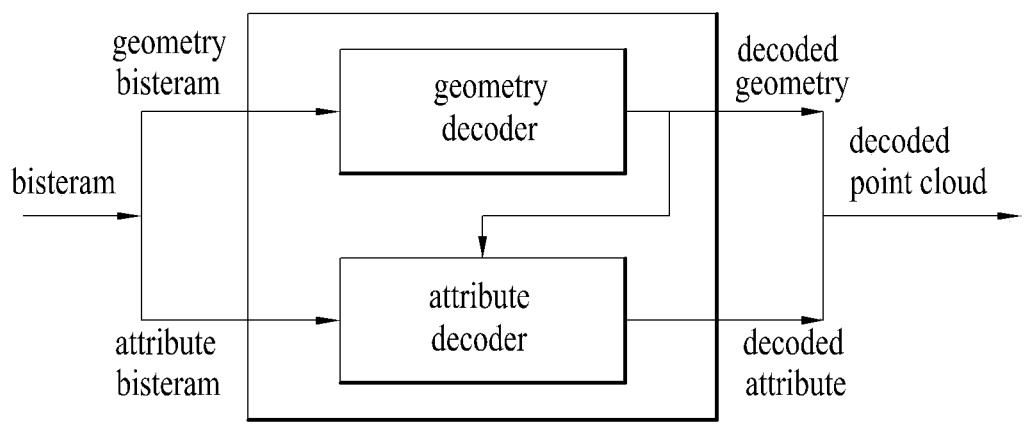
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
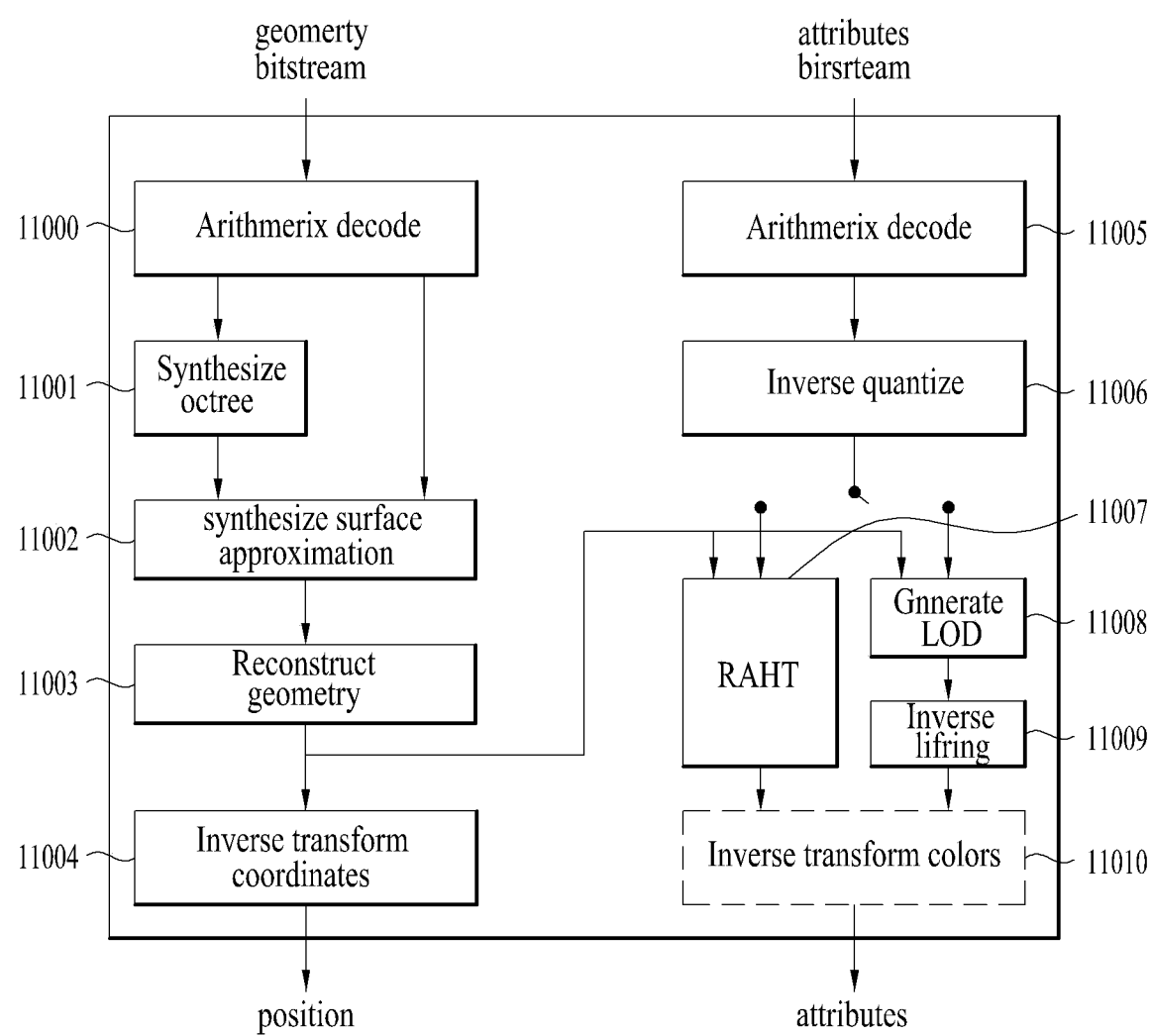
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
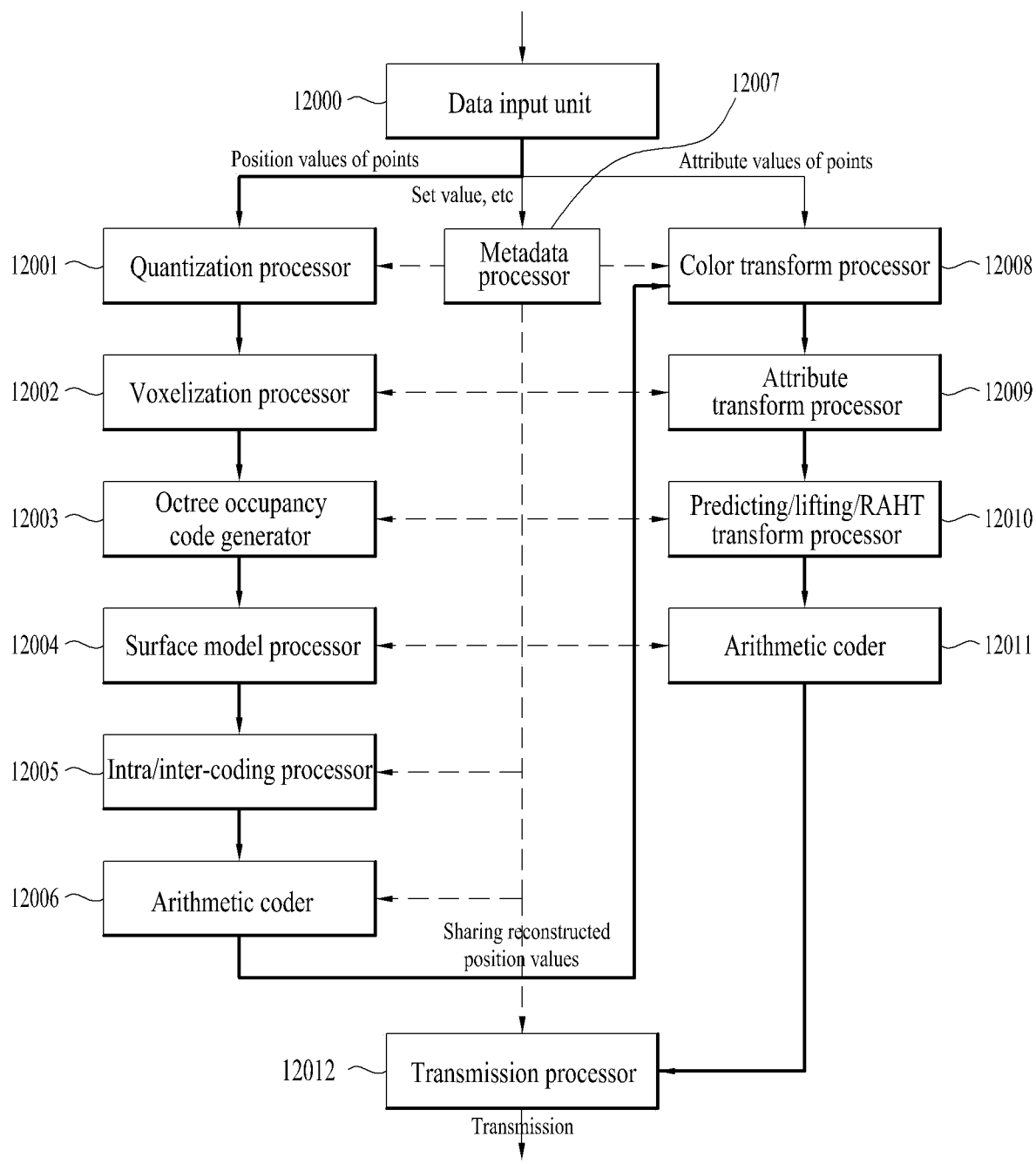
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
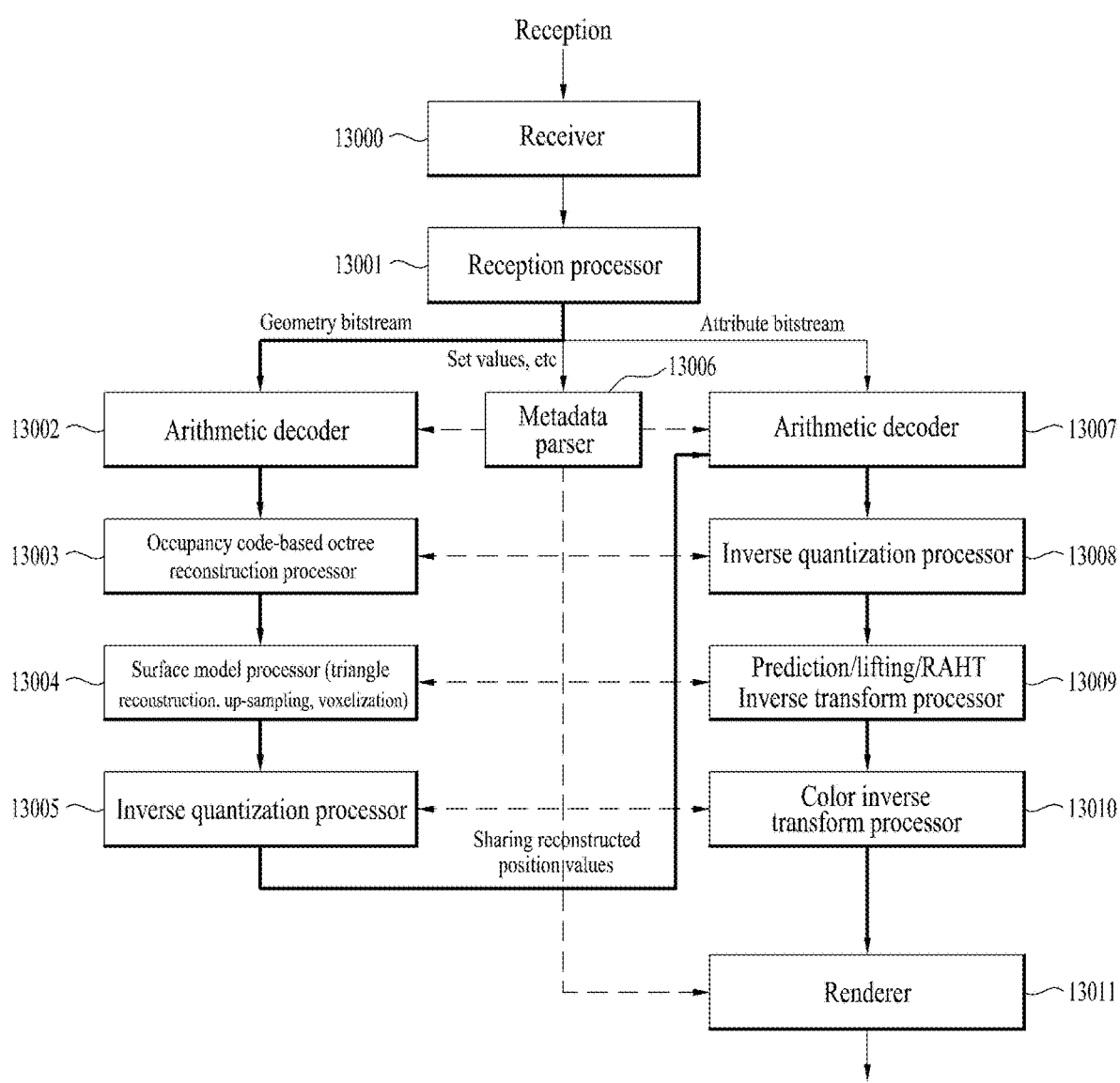
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
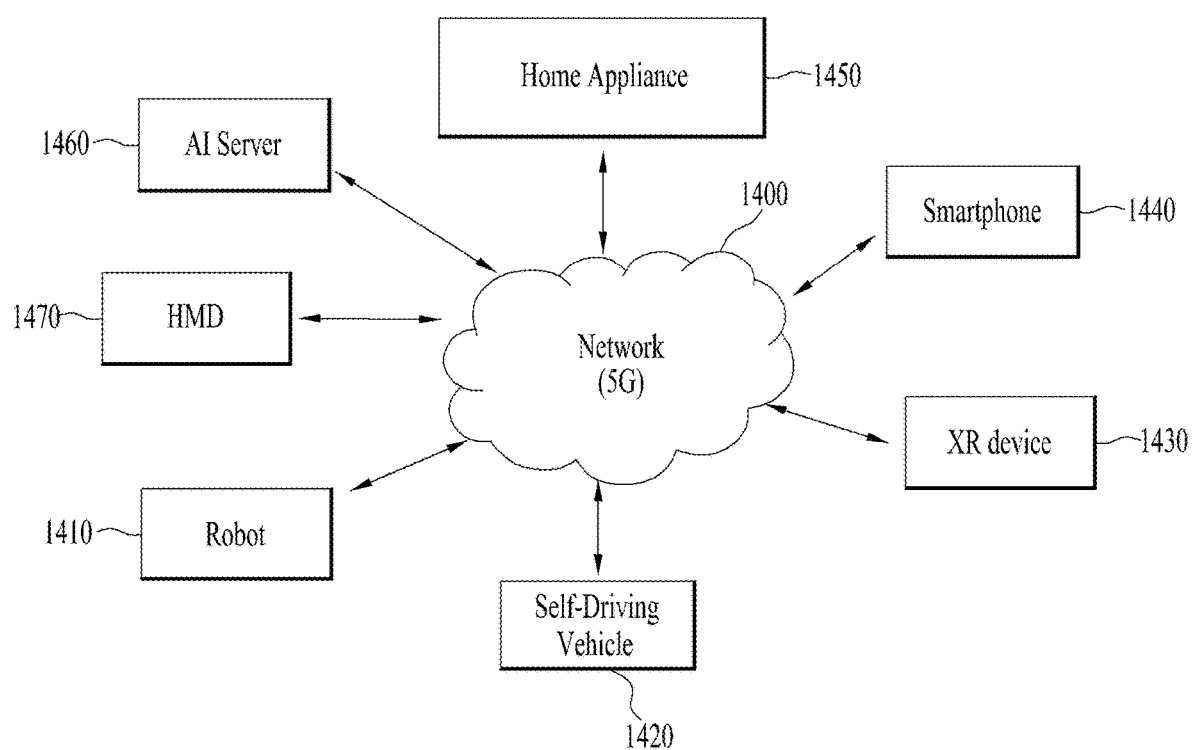
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

In the present disclosure, the method/device for transmitting and receiving point cloud data according to the embodiments may be simply referred to as a method/device according to embodiments.

In the present disclosure, geometry may be referred to as geometry data, geometry information, position values of points, or the like.

In the present disclosure, an attribute may be referred to as attribute data, attribute information, attribute values (color, reflectance, etc.) of points, or the like.

Figure 15:
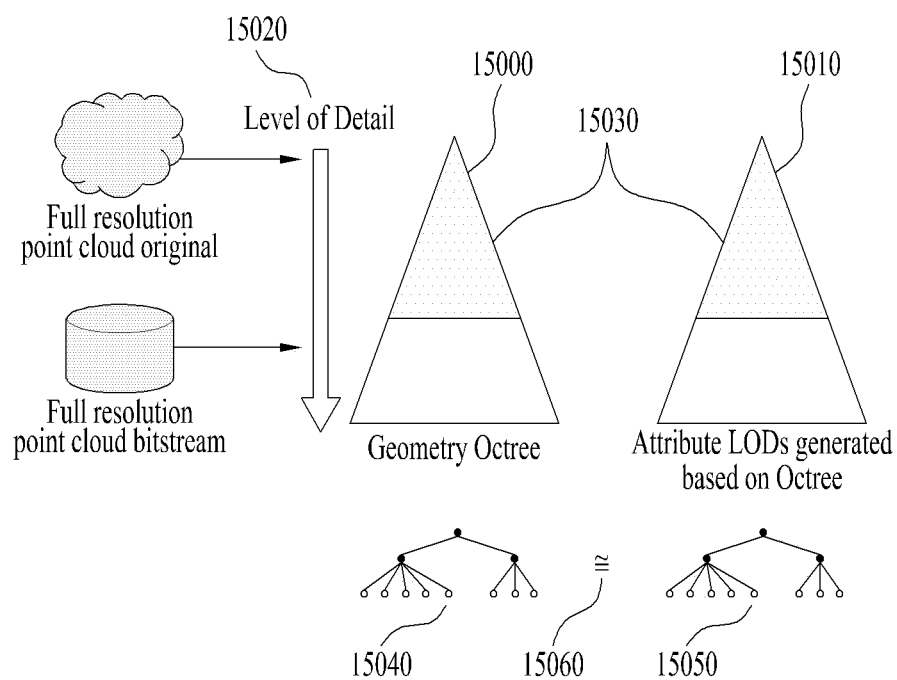
FIG. 15 shows a geometry octree and attribute Levels of Detail (LOD) generated based on the octree according to embodiments.

FIG. 15 shows a geometry octree and attribute Levels of Detail (LOD) generated based on the octree according to embodiments.

FIG. 15 illustrates a geometry octree 15000 and attribute LODs 15010 generated in the process of encoding points by the point cloud video encoder 10002 of FIG. 1, the encoding 20001 of FIG. 2, the encoder of FIG. 4, and the transmission device of FIG. 12.

FIG. 15 illustrates a geometry octree 15000 and attribute LODs 15010 generated in the process of decoding a bitstream containing point cloud data by the point cloud video decoder 10006 of FIG. 1, the decoding 20003 of FIG. 2, the decoder of FIG. 4, the decoder of FIG. 11, and the reception device of FIG. 13.

Embodiments relate to a method for increasing geometry compression efficiency by providing a spatial scalability function of geometry-based point cloud compression (G-PCC) for compression of 3D point cloud data by reconstructing positions of points based on an octree.

The geometry octree 15000 is an octal tree for position values of points generated by the octree analyzer 40002 of the encoder according to embodiments (see FIGS. 5 and 6).

The attribute LODs 15010 are a set of LODs for an octree-based attribute generated by the LOD generator 40009 of the encoder according to embodiments (see FIGS. 8 and 9).

The geometry octree 15000 and the attribute LODs 15010 may include a specific level 15030. Among the levels, a low LOD index may represent a point cloud original of full resolution, and a high LOD index may represent a point cloud bitstream of full resolution (see FIG. 8).

The method/device according to the embodiments may perform scalable encoding and/or decoding based on a specific level 15030.

That is, embodiments may generate the octree 15000 of points generated through scalable geometry encoding/decoding at a specific depth 15030 of the octree. In addition, the attribute LODs 15010 may be generated through scalable attribute encoding/decoding (lifting scheme).

Here, as the leaf nodes at a position 15040 on the octree 15000 of points match the positions of the attribute LODs 15010 at a position 15050 on the octree to the maximum degree (as indicated by 15060), point cloud data compression efficiency may be increased.

In this regard, embodiments propose operations of an encoder/decoder that processes point cloud data such that the positions of points on the geometry octree 15040 are similar to the positions 15050 of points on the attribute octree, and a syntax of signaling information therefor.

The method/device according to the embodiments may perform geometry position reconstruction for spatial scalability, and may generate and transmit/receive signaling information to support this method.

Figure 16:
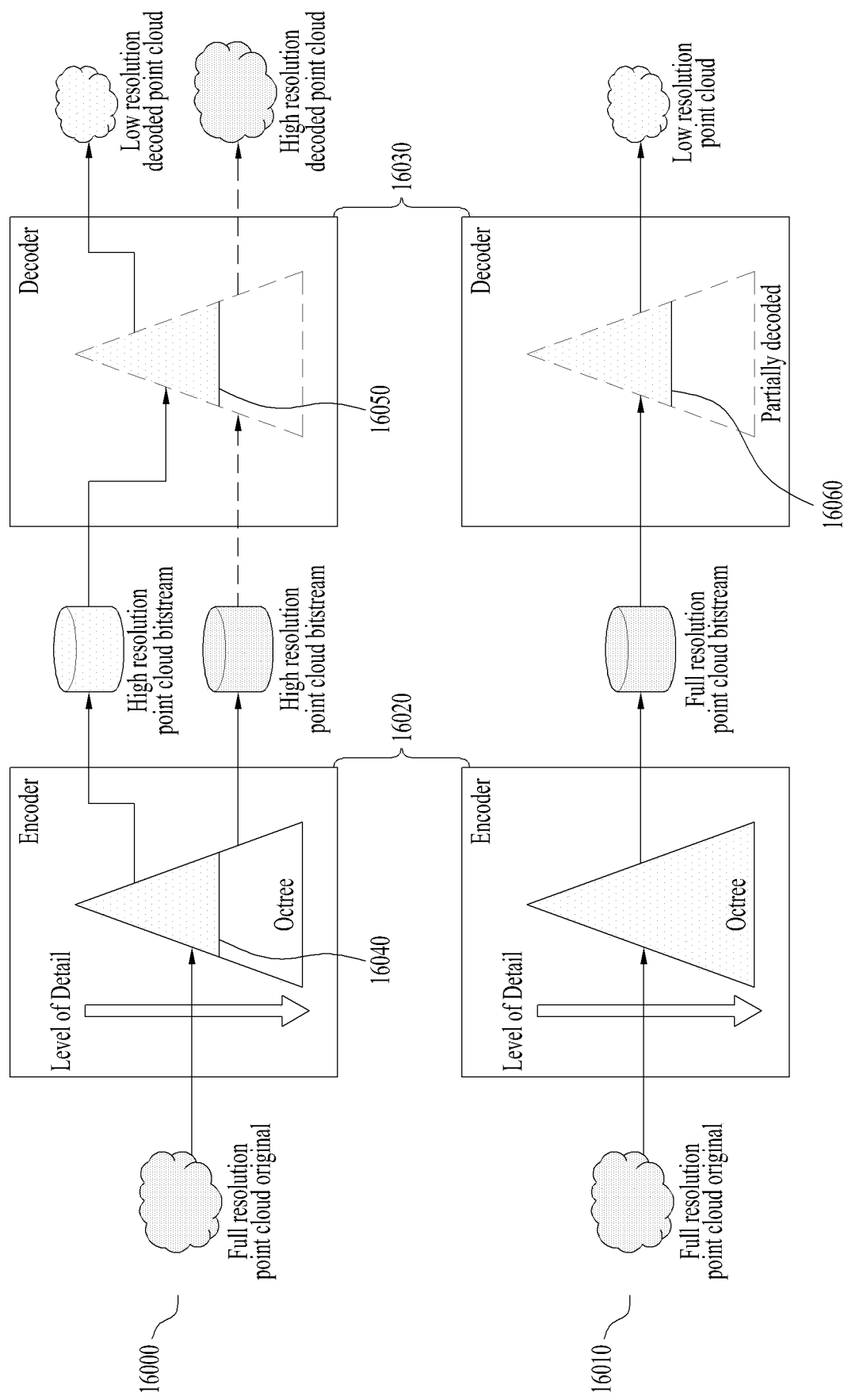
FIG. 16 illustrates a method for processing a bitstream based on LODs according to embodiments.

FIG. 16 illustrates a method for processing a bitstream based on LODs according to embodiments.

The encoder 1602 may correspond to the transmission device 10000 of FIG. 1, the point cloud video encoder 10002 of FIG. 1, the encoder 20001 of FIG. 2, the encoder of FIG. 4, the transmission device of FIG. 12, and the XR device 1430 of FIG. 14.

Figure 17:
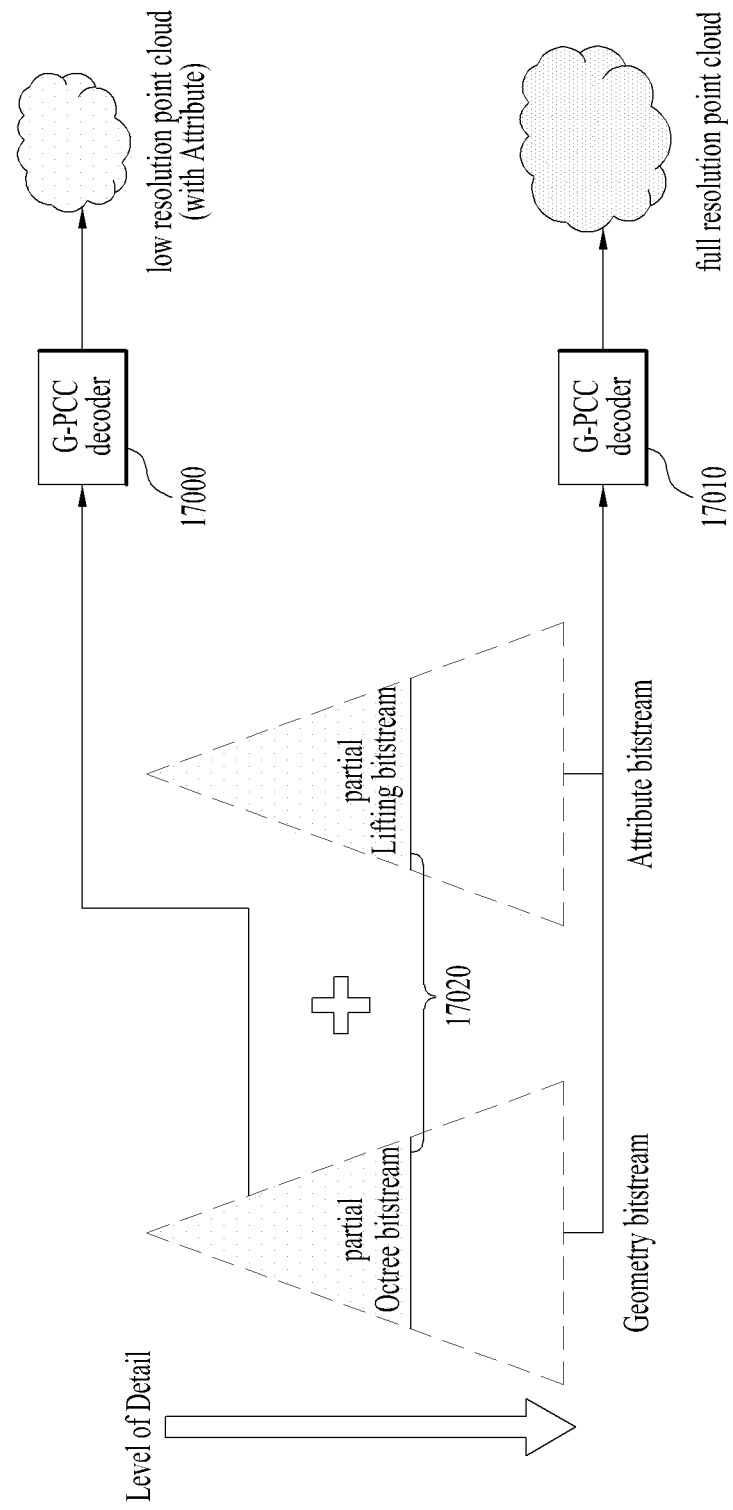
FIG. 17 shows a spatial scalability structure of geometry and attributes according to embodiments.

The decoder 1630 may correspond to the reception device 10004 of FIG. 1, the point cloud video decoder 10006 of FIG. 1, the decoder 20003 of FIG. 2, the decoder of FIGS. 10 and 11, the reception device of FIG. 13, the XR device 1430 of FIG. 14, and the decoders 17000 and 17010 of FIG. 17.

Embodiments may perform geometry position encoding/decoding to support spatial scalability of geometry-based point cloud compression (G-PCC) for compression of 3D point cloud data.

When the point cloud data is dense and the bandwidth is low, the method/device according to the embodiments may provide a function of sending and processing a point cloud having a low resolution. The method/device according to the embodiments may process point cloud according to the function of the reception device to allow the reception device to render the point cloud data.

In addition, when the point cloud data is dense and the performance of the decoder is low, the method/device according to the embodiments may provide a function of providing a point cloud of low resolution by partially decoding the data to reduce the amount of computation on the decoder side.

As in operation 16000, the encoder 16020 may receive point cloud original data of full resolution. The encoder 16020 may construct the geometry of the point cloud data as an octree. The encoder 16020 may encode only the geometry 16040 of levels up to a specific level based on the LODs. Depending on the LOD level, the encoder 16020 may generate a low resolution point cloud i-th LOD or a high resolution point cloud bitstream. The decoder 16030 may receive the low revolution point cloud i-th LOD or the high resolution point cloud bitstream transmitted from the encoder. The decoder 16030 may decode, reconstruct, and render point cloud data corresponding to a specific level 16050. The decoder 16030 may generate a low resolution decoded point cloud or a high resolution decoded point cloud.

As in operation 16010, the encoder 16020 may receive full resolution point cloud original data. The encoder 1602 may encode a geometry octree of all levels, not a specific level. The encoder 16020 may generate a full resolution point cloud bitstream. The decoder 16030 may receive the full resolution point cloud bitstream. The decoder 16030 may decode and reconstruct the point cloud data up to a specific level 16060. The decoder 16030 may generate low resolution point cloud data.

Data processing as illustrated in FIG. 16 provides an effect related to spatial scalability of point cloud data.

The transmission device or encoder according to the embodiments may partially encode and transmit the point cloud data as in operation 16000. The transmission device or encoder according to the embodiments may fully encode and transmit the point cloud data as in operation 16010. The reception device or decoder according to the embodiments may reconstruct the received point cloud data by partially decoding the point cloud data in a scalable manner based on a specific level of the octree.

With the spatial scalability function according to the embodiments, point cloud data may be efficiently processed according to a transmission environment, characteristics or performance of the reception device, and the like.

FIG. 17 shows a spatial scalability structure of geometry and attributes according to embodiments.

Decoders 17000 and 17010 may correspond to or be combined with a point cloud video decoder 10006 of the reception device 10004 of FIG. 1, the decoder 20003 of FIG. 2 configured to perform a decoding operation, and the decoder 20003 of FIG. 11 configured to decode the geometry bitstream and the attribute bitstream, the reception device of FIG. 13, the XR device 1430 of FIG. 14, or the decoder 16030 of FIG. 16.

The decoder 17000 according to the embodiments may reconstruct low resolution point cloud data with attributes. The decoder 17000 may receive partial geometry data and partial attribute data corresponding to a specific level 17020 of an octree from a geometry bitstream and an attribute bitstream represented by a level of detail (LOD), and reconstruct the low resolution point cloud data with attributes.

The decoder 17010 according to the embodiments may reconstruct full resolution point cloud data. The decoder 17010 may receive geometry data and attribute data including the levels up to the end of the octree from a geometry bitstream and attribute bitstream represented by the level of detail (LOD) level and reconstruct the full resolution point cloud data.

Geometry encoding and geometry decoding according to embodiments may provide the spatial scalability function through a process of encoding or decoding occupancy bits only up to a depth level (e.g., 15030, 16040, 16050, 16060) selected by adjusting the depth level of the octree.

In order to provide the spatial scalability function according to embodiments, the encoder and/or decoder may need to rearrange the geometry position values.

The encoder and/or decoder of the transmission/reception device according to the embodiments may increase the geometry compression efficiency by reconstructing the position (e.g., geometry) of a point based on a octree for the spatial scalability function.

Furthermore, the spatial scalability function according to the embodiments may be combined with other embodiments. That is, terms used in this specification may be understood based on the intended meanings of the terms within a scope widely adopted in the relevant field.

The method/device according to the embodiments may apply the same octree structure to the geometry so as to provide the spatial scalability function in encoding and/or decoding (see FIG. 17). A scheme is proposed in which the method/device according to the embodiments constructs a partial geometry up to the selected depth level 17020 of the octree from the entire geometry bitstream. A method of reconstructing geometry for each LOD may be performed by the PCC decoder/encoder according to the embodiments.

Figure 18:
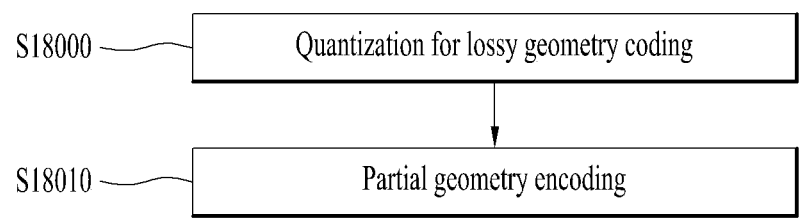
FIG. 18 illustrates an operation of geometry encoding according to embodiments.

FIG. 18 illustrates an operation of geometry encoding according to embodiments.

FIG. 18 illustrates an operation for supporting spatial scalability as shown in FIGS. 15 and 16 when the geometry is encoded by the transmission device 10000 of FIG. 1, the point cloud video encoder 10002, the encoder 20001 of FIG. 2, the encoder of FIG. 4, the transmission device of FIG. 12, the XR device 1430 of FIG. 14, and the like.

S18000: Quantization for lossy geometry coding

An encoder according to embodiments may perform lossy geometry coding. For lossy geometry coding, the encoder according to the embodiments may quantize the geometry. A detailed operation of quantization according to the embodiments will be described with reference to FIG. 19.

S18010: Partial geometry encoding

The encoder according to the embodiments may partially encode geometry. The partial geometry encoding according to the embodiments will be described with reference to FIG. 20.

Figure 19:
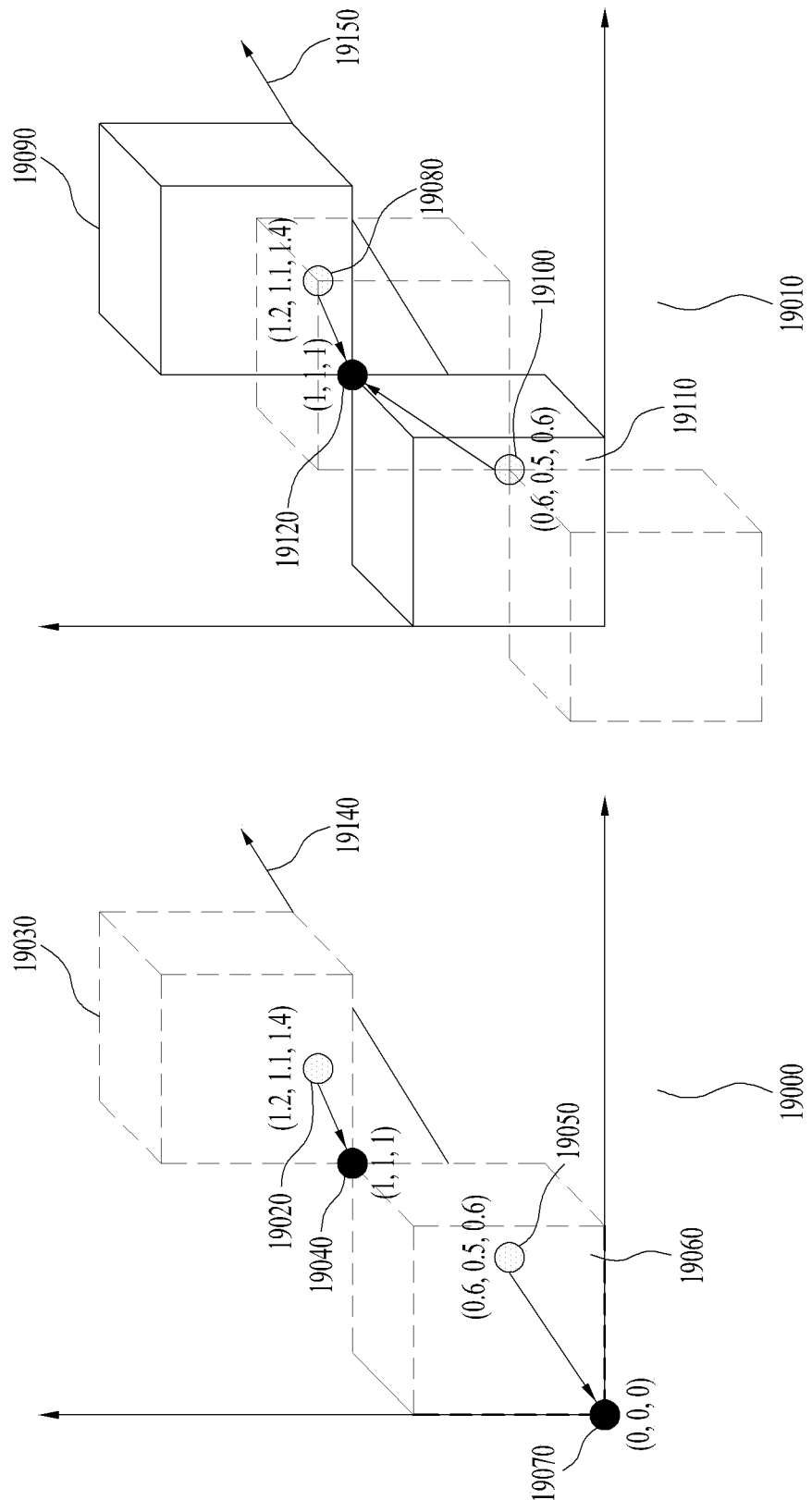
FIG. 19 illustrates floor quantization and rounding quantization according to embodiments.

FIG. 19 illustrates floor quantization and rounding quantization according to embodiments.

FIG. 19 illustrates the detailed operation of S18000 in FIG. 18;

The operation of FIG. 19 represents an operation of quantizing geometry by an encoder according to embodiments. For example, the quantizer or voxelizer 40001 of FIG. 4 or the voxelization processor 12002 of FIG. 12 may perform quantization illustrated in FIG. 19.

The encoder according to the embodiments may perform quantization by multiplying a geometry position value by a scale value for lossy geometry coding. When the geometry is quantized, the position value indicated by the geometry data is changed.

The quantization according to the embodiments may include ceiling, floor, and rounding operations.

The encoder according to the embodiments may quantize geometry based on various quantization types for spatial scalability. The encoder may transmit quantization type information applied to the geometry in a point cloud bitstream. The decoder according to the embodiments may reconstruct the position of the geometry based on quantization type information contained in the bitstream.

The floor quantization 19000 according to the embodiments may change the point position value of the geometry by the floor operation. A point 19020 in a voxel 19030 may have position values (1.2, 1.1, 1.4) in the coordinate system. When the encoder quantizes the point 19020 through the floor operation, the fractional part of each position value may be removed. For example, position values (1.2, 1.1, 1.4) are quantized to position values (1, 1, 1). A point 19050 in a voxel 19060 may have position values (0.6, 0.5, 0.6) in the coordinate system. When the encoder quantizes the point 19050 through the floor operation, the position values (0.6, 0.5, 0.6) may be quantized to (0, 0, 0).

The rounding quantization 19010 according to the embodiments may transform a point position value of a geometry into a near integer. A point 19080 4 in a voxel 19090 may have position values (1.2, 1.1, 1.4). 1.2, 1.1, and 1.4 are between 1 and 2. In rounding quantization, each coordinate value may be set to the nearest value between 1 and 2. That is, (1.2, 1.1, 1.4) is quantized to (1, 1, 1). A point 19100 in a voxel 19110 may have position values (0.6, 0.5, 0.6). The position values (0.6, 0.5, 0.6) may be quantized to position values (1, 1, 1). According to embodiments, 0.5 may be quantized to 1 by rounding. According to embodiments, a point at the center between the two integers, such as 0.5, may be quantized to 0 or 1 according to the setting according to the embodiments.

The method/device according to the embodiments may set a representative position of a node of an octree based on a quantization technique (e.g., ceiling, floor, rounding, etc.).

As shown in FIG. 19, the encoder according to the embodiments may perform lossy coding by quantizing the position values of a geometry.

According to embodiments, the encoder may quantize points along a direction 19140, 19150 according to an encoding order.

The quantization according to the embodiments may be used for lossy geometry coding. When lossless coding rather than lossy coding is applied, the quantization operation may be optional.

Figure 20:
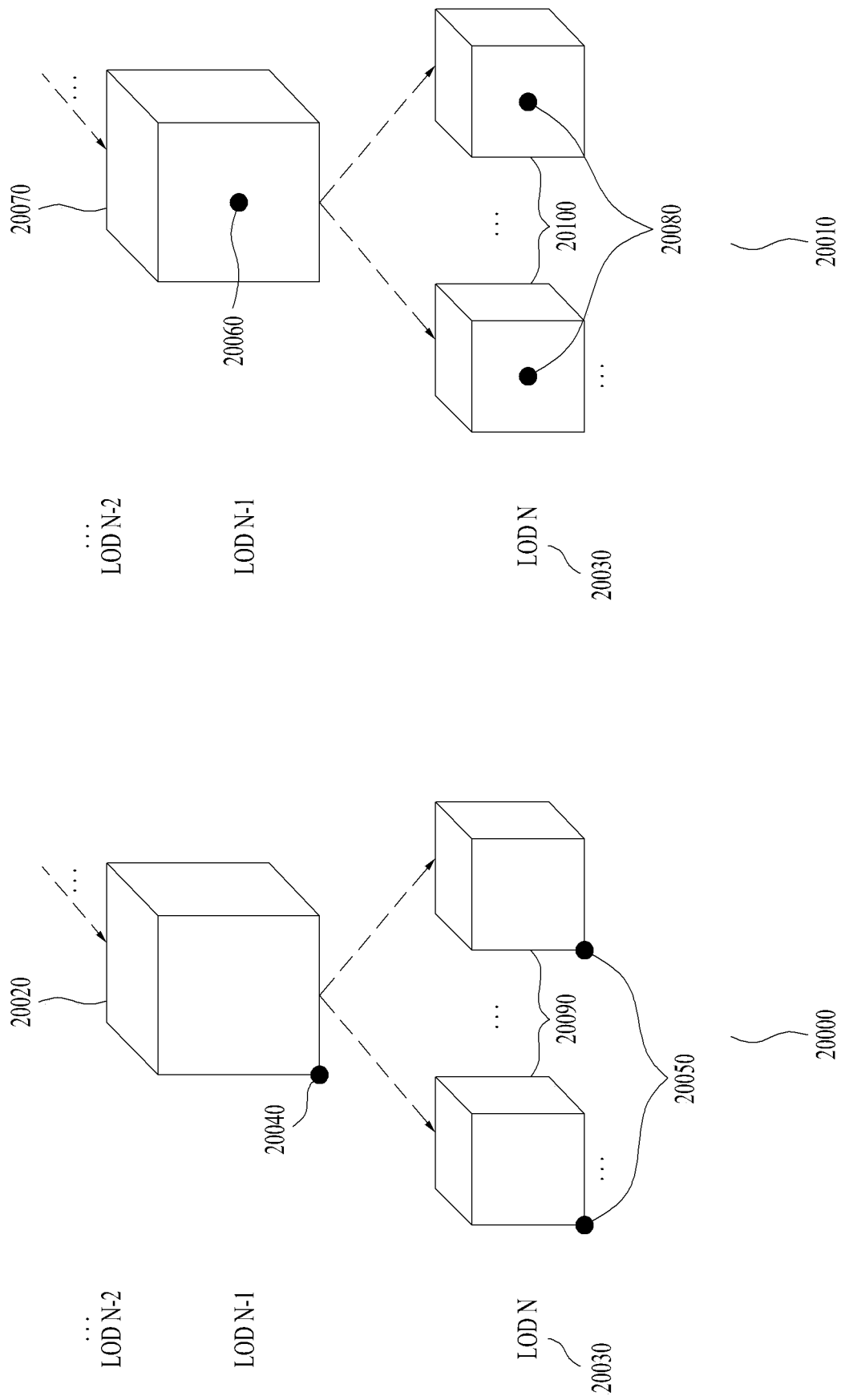
FIG. 20 illustrates an operation of reconstructing a geometry (position) on an intermediate node of an octree according to embodiments.

FIG. 20 illustrates an operation of reconstructing a geometry (position) on an intermediate node of an octree according to embodiments.

FIG. 20 illustrates a detailed operation of S18010 in FIG. 18.

The encoder according to the embodiments may generate and transmit a partial geometry bitstream by encoding the octree only up to a specific depth level of the octree for spatial scalability, rather than encoding the full octree (up to a leaf node of the octree).

As shown in FIGS. 15 and 16, occupancy bits up to a specific depth level of the octree may be generated and the encoder according to the embodiments may reconstruct geometry position information based on the encoded geometry information in order to encode an attribute.

As shown in FIGS. 18 to 20, in reconfiguring the geometry position, the encoder according to the embodiments may set a representative position of an octree intermediate node (LOD N in FIG. 20), not the leaf node of the octree, and reconstruct the position as a point.

The representative position may be set to a left, bottom, front point of a node region (or bounding box, voxel, etc.) 20020, 20070, 20090, 20100 (20000), or to middle/center position. It may be set to a centroid according to the distribution (20010). The representative position may be set to various other corner positions.

The middle position according to the embodiments may refer to the middle position of each node region in LOD N (the middle value of the bounding box regardless of the point positions within the node).

The centroid according to the embodiments is the actual center value of the points included in each node region in LOD N. After checking whether the centroid is the left/bottom/front point of a sub-node including the point, or the center of the sub-node, the type of the position thereof and the index (0 to 7) of the sub-node are signaled to the decoder through signaling information.

The method/device according to the embodiments reconstructs a geometry value as a representative position in reconstructing a geometry position. Such reconstruction may ensure better matching between the geometry position and a result from attribute coding. This is because that in attribute coding, the weight (distance) is calculated with the position shifted to the representative middle position. In addition, in partial decoding, when a position at an intermediate level is reconstructed as a bottom/left/front, this value may not be an actual value. That is, it is an imaginary value. This is because the position of the actual point in the region may be known only after data is decoded up to the leaf level. Therefore, taking the center point as the representative position may increase the encoding/decoding efficiency.

In the partial decoding according to the embodiments, data only up to level L level, which is a specific level among a plurality of levels, may be reconstructed for a specific reason, for example, because the decoder does not want, cannot, or does not need to decode the full level. Accordingly, not all representative positions of the nodes from level 0 to level N are reconstructed, but representative positions are reconstructed according to the occupancy bits for each octree node at level L desired by the decoder. When the occupancy bit of an octree node is 0, the corresponding representative position is not reconstructed.

The encoder according to the embodiments may represent point cloud data, for example, geometry in an octree structure. The octree is composed of a node region 20020 and points included in the node region 20020 according to the octree level.

The octree level may be expressed by LODs 20030. The LODs are from LOD 0 to LOD N, and the size of the node region decreases as the LOD index increases to N. In a level corresponding to the leaf node, the node region may correspond to a voxel.

As in operation 20000, the encoder according to the embodiments may represent geometry points positioned in a space in an octree structure, based on a point distance such as the LOD.

For example, in level LOD N−1, a node region 20020 may include one or more points. The encoder according to the embodiments may set the representative position of the points of the node region 20020 to a left, bottom, front position 20040. The points of the node region 20020 may be regarded as points of the representative position 20040. In the octree structure, a node of level LOD N−1 may include up to 8 nodes as sub-nodes (or child nodes). One or more nodes included in level LOD N may also set the representative position of each node region to the left, bottom, front position 20050 of each node region.

In operation 20010 compared to operation 20000, the encoder according to the embodiments may set the representative position of each node region to the middle position 20060 of the node region.

For example, at level LOD N−1, the representative position of the node region 20070 may be the center. In the octree structure, the node region 20070 may include up to eight sub-nodes (or child nodes). At level LOD N, one or more nodes may have a middle position of each node as a representative position 20080 of the one or more points included in the node.

A representative position type of an octree node according to embodiments may be signaled. The encoder according to the embodiments may transmit information indicating the representative position type (representing operation 20000, 20010, or the like) of the octree node according to the embodiments as metadata, signaling information, or parameters over a point cloud bitstream. The reception device according to the embodiments may reconstruct a position of a geometry included in a point cloud bitstream based on the representative position type related information contained in the bitstream.

When the encoder according to the embodiments encodes an attribute based on LODs, the encoder may search for neighbor points, considering the center as the representative position of the attribute.

For example, when a weight calculation method is used in attribute coding, a reference distance may be calculated based on shift to the center.

FIG. 20 shows a spatially scalable geometry encoding method as compared with attribute encoding.

When the encoder according to the embodiments sets the centroid of the points according to the distribution of the points in space, the encoder may calculate the position to which the centroid at the child level position belongs to at the current octree depth level (0 to N). The centroid may be set to the left, bottom, front position, the middle position, or each corner of the child level.

The encoder or metadata processor according to the embodiments may add a position index of the lower level and a representative position type of the lower level to the point cloud bitstream as signaling information or parameters. Based on the signaling information, the decoder according to the embodiments may reconstruct a partial geometry position.

The representative value of the representative position type applied in partial geometry encoding may be set according to the quantization type applied in the quantization of lossy geometry.

For example, when the quantization type is rounding, the representative position type may be set to the center. When the quantization type is ceil, the representative position type may be set to a right-top-back position. The quantization type and/or the representative position type according to the embodiments may be transmitted as parameters or signaling information in a bitstream. The decoder may reconstruct the partial geometry point position based on the parameters or signaling information.

The method according to the described embodiments may be applied to the encoder and/or decoder in the same manner. In attribute encoding and/or attribute decoding, the attribute encoding/decoding may be performed based on the same point(s).

When the partial geometry is encoded, not only the depth of the full octree but also a depth level of the octree used for the encoding may be carried in a bitstream as signaling information.

The signaling information according to the embodiments will be described in detail together with the structure of the point cloud bitstream with reference to FIG. 24.

The geometry position reconstruction of FIG. 20 may be operated by the following syntax.

```
for( child = 0; child < GeometryNodeChildrenCnt; child++ ) {
    childIdx = GeometryNodeChildren[ child ];
    x = 2 × xN + ( childIdx & 4 ) == 1 ;
    y = 2 × yN + ( childIdx & 2 ) == 1 ;
    z = 2 × zN + ( childIdx & 1 ) == 1 ;
```

```
    for( i = 0; i < GeometryNodeDupPoints[ child ] + 1 ; i++, PointCount++ ) {
      PointPos[ PointCount ][ 0 ] = geomScale( x, 0);
      PointPos[ PointCount ][ 1 ] = geomScale( y, 1);
      PointPos[ PointCount ][ 2 ] = geomScale( z, 2);
    }
    if( direct_mode_flag ) {
      if (!duplicatedPointFlag) {
        for( i = 0; i <= num_direct_points_minus1; i++, PointCount++ ) {
          PointPos[ PointCount ][ 0 ] = geomScale( ( x <<
EffectiveChildNodeSizeLog2 ) + PointOffsetX[ i ] , 0);
          PointPos[ PointCount ][ 1 ] = geomScale( ( y <<
EffectiveChildNodeSizeLog2 ) + PointOffsetY[ i ] , 1);
          PointPos[ PointCount ][ 2 ] = geomScale( ( z <<
EffectiveChildNodeSizeLog2 ) + PointOffsetZ[ i ] , 2);
        }
      }
      else {
        for( i = 0; i <= num_direct_points minus1; i++, PointCount++ ) {
          PointPos[ PointCount ][ 0 ] = geomScale( ( x <<
EffectiveChildNodeSizeLog2 ) + PointOffsetX[ 0 ] , 0);
          PointPos[ PointCount ][ 1 ] = geomScale( ( y <<
EffectiveChildNodeSizeLog2 ) + PointOffsetY[ 0 ] , 1);
          PointPos[ PointCount ][ 2 ] = geomScale( ( z <<
EffectiveChildNodeSizeLog2 ) + PointOffsetZ[ 0 ] , 2);
        }
      }
    }
  }
if(minGeomNodeSizeLog2 > 1) {
mask = (−1) << minGeomNodeSizeLog2;
for( i = 0; i < PointCount ; i++) {
PointPos[ i ][ 0 ] = (PointPos[ i ][ 0 ] & mask) + (1 << (minGeomNodeSizeLog2 − 1))
PointPos[ i ][ 1 ] = (PointPos[ i ][ 1 ] & mask) + (1 << (minGeomNodeSizeLog2 − 1))
PointPos[ i ][ 2 ] = (PointPos[ i ][ 2 ] & mask) + (1 << (minGeomNodeSizeLog2 − 1))
}
}
```

The method/device according to the embodiments may set the position of each node at a specific octree level (e.g., LOD 0 to N) to center values (e.g., 20060, 20080) through bit operation. That is, the & and <<operations leave or delete 0/1 bit to shift the position to the center.

The level of the octree may be set to minGeomNodeSizeLog2.

In order to apply a specific octree level, the operation of Mask=(−1)<<minGeomNodeSizeLog2 may generate a bit to delete the rightmost digits based on 0 s and the & operation.

The PointPos[i][0] & mask operation may delete the right digit from the position value. Then, the position values of the left, bottom, front of the octree of the level may be generated.

The operation of +(1<<(minGeomNodeSizeLog2−1)) may obtain the size value of one sub-octree node. By adding the corresponding values, the middle position of the octree level may be derived.

The operation of geometry position reconstruction of FIG. 20 may be performed by a geometry encoder or a point cloud encoder. Furthermore, the geometry position reconstruction is performed in association with attribute encoding and/or attribute decoding. That is, when the geometry position is reconstructed, point cloud data may be reconstructed well.

In reconstructing the point cloud data, when not all levels are reconstructed or the data is reconstructed only up to an intermediate level (partial decoding, 16030), the reconstructed values may be set to the values of the left/bottom/front (i.e., virtual values) by default. It is not known which sub-octree node is occupied at the intermediate node. The left/bottom/front is also a virtual value. In encoding and/or decoding an attribute, a weight for the nearest neighbor (NN) of each point must be calculated. Thus, the weight (distance) is calculated after shifting the value of the node to the middle position value.

Therefore, when the geometry is reconstructed at an intermediate level rather than at the entire levels (17020), reconstructing the position of the geometry to the center value according to the weight calculation method for the attribute may enhance matching between the reconstructed point and the reconstructed color, thereby obtaining a very high PSNR.

Reconstructing the geometry as the left/bottom/front point may reduce the error resulting from mismatch when the weight of the NN is calculated on the assumption that the attribute is at the center. In partial decoding, as both the geometry/attribute are reconstructed into the center (20060, 20080) so as to be matched, the PSNR may be improved.

The representative position may be reconstructed to decode data only up to a specific level. That is, partial decoding is possible. According to embodiments, encoding may be performed at the full level (16010). Apart from shifting the attribute coding NN weight to the center in attribute encoding, geometry position reconstruction may provide the above-described effect.

In estimating a weight through calculation of a distance from the NN in attribute coding, the positions of both the target point and the point of the NN may be changed to the center and the distance thereof may be calculated. That is, scalability coding is possible. In partial decoding or full level decoding, the same weight may be applied.

Figure 21:
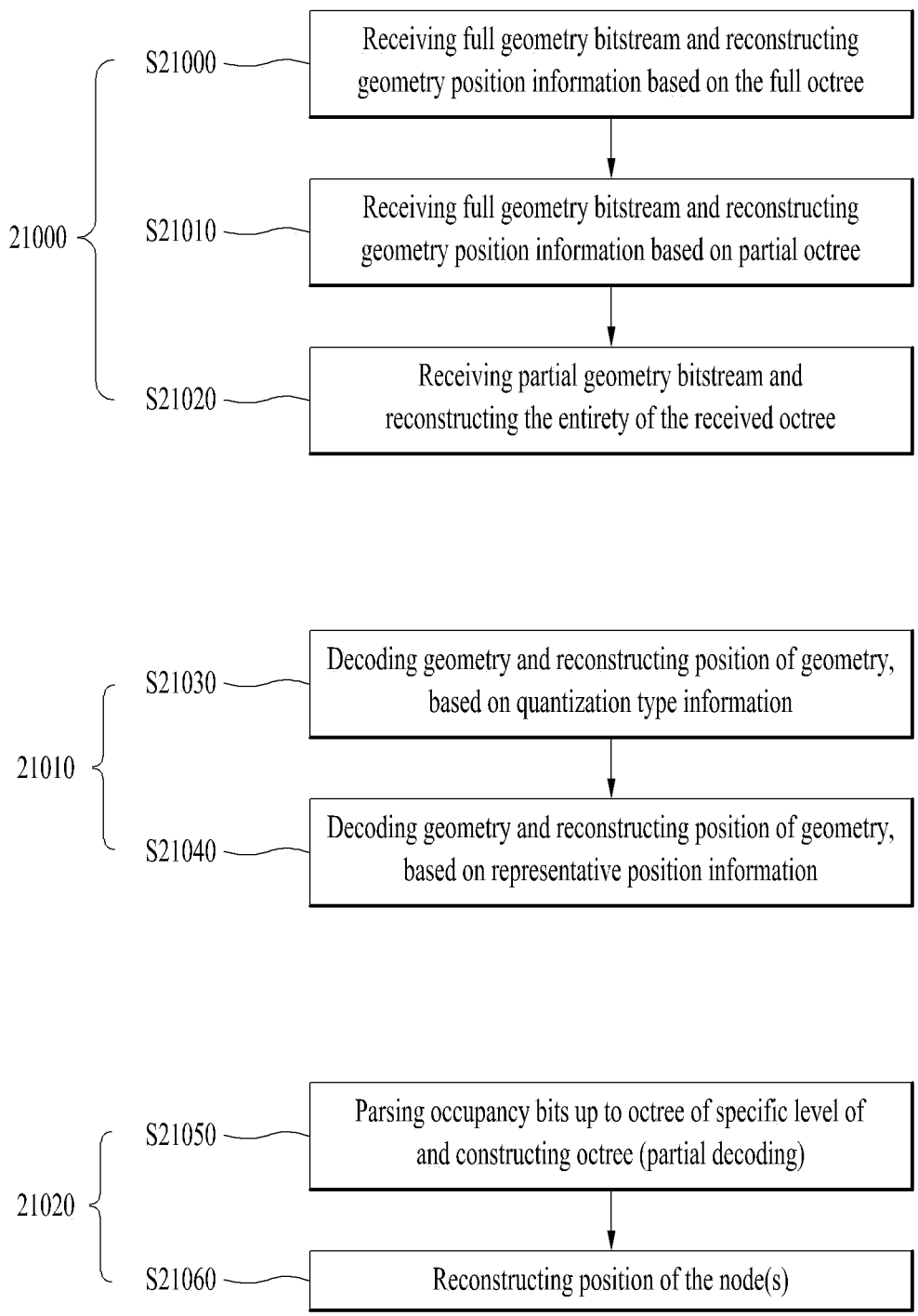
FIG. 21 illustrates an operation of partial geometry decoding according to embodiments.

FIG. 21 illustrates an operation of partial geometry decoding according to embodiments.

The decoders 17000 and 17010 correspond to the operation of partial geometry decoding, which is performed by the point cloud video decoder 10006 of the reception device 10004 of FIG. 1, the decoder 20003 of FIG. 2 configured to perform decoding, and the decoder of FIG. 13 configured to decode the geometry bitstream and the attribute bitstream, the XR device 1430 of FIG. 14, the decoder 16030 of FIG. 16.

Operation 21000 represents a partial geometry decoding operation according to embodiments.

In order to provide the spatial scalability function, not all the octree (up to the leaf node of the octree) may be encoded, but only a part of the octree up to a specific depth level may be encoded to generate a partial geometry bitstream and transmit the generated bitstream to the decoder. For example, partial geometry encoding may be used support thumbnails.

In addition, although the full octree bitstream is encoded, there may be a case where thumbnails are preferentially and quickly required by the decoder due to lack of capacity or resources of the decoder or according to a scenario. In this case, the decoder may not decode all the octree-based bitstream received, but may decode only part of the bitstream up to a specific depth level of the octree.

The geometry decoding may include the following three cases. The reception device and/or decoder according to the embodiments may execute the following three cases according to embodiments, respectively.

Case 1 (S21000): Receiving a full geometry bitstream (full geometry encoding), and reconstructing geometry position information based on the full octree (full geometry decoding).

The reception device or decoder according to the embodiments receives a bitstream containing the entire geometry of full resolution from the transmission device or encoder. The reception device may reconstruct the entire position information about the geometry from the entire geometry based on the octree.

Case 2 (S21010): Receiving a full geometry bitstream (full geometry encoding), and reconstructing the geometry position information based on a partial octree (partial geometry decoding).

The reception device receives a bitstream containing the entire geometry of full resolution from the transmission device. The reception device may reconstruct partial position information of the geometry up to a partial specific level from the octree-based geometry (spatial scalability).

Case 3 (S21020): Receiving a partial geometry bitstream (partial geometry encoding), and reconstructing the entirety of the received octree (partial geometry decoding).

The reception device receives a partial geometry bitstream from the transmission device. The reception device may reconstruct the entirety of the octree corresponding to the partial geometry.

Case 2 (S21010) and/or Case 3 (S21020) may correspond to partial geometry decoding. Case 2 (S21010) may correspond to operation 16010 of FIG. 16, and Case 3 (S21020) may correspond to operation 16000 of FIG. 16.

For the partial geometry decoding, the reception device according to the embodiments may perform the following operations S21030 and S21040 using the information described below.

S21030: Decoding geometry and reconstructing the position of the geometry, based on the quantization type information.

Based on the quantization type information contained in the bitstream received from the encoder, the decoder may decode the geometry and reconstruct the position values of the geometry.

S21040: Decoding geometry and reconstructing the position of the geometry, based on the representative position information.

Based on representative position information contained in the bitstream received from the encoder, the decoder may decode the geometry and reconstruct the position values of the geometry.

The reception device may decode the position of the partial geometry according to embodiments in the follow operations S21050 and S21060.

S21050: Parsing occupancy bits up to an octree of a specific level of and constructing the octree (partial decoding).

The decoder may parse occupancy bits included in the received geometry. Then, occupancy bits corresponding to an octree up to a specific level are parsed for partial decoding. The octree may be constructed based on the parsed occupancy bits.

In other words, the occupancy bits up to an octree of a specific level for partial decoding may be parsed from a geometry bitstream and the octree may be constructed. Nodes may be constructed according to the occupancy bits at the specific level.

S21060: Reconstructing the position of the node(s).

The decoder may reconstruct the position values of the constructed nodes. In the process of constructing the position values, the position within the node may be calculated as the same position as obtained by the quantization type. For example, as shown in FIG. 19, the position of the point 19080 quantized to the point 19120 may be reconstructed and calculated.

Figure 22:
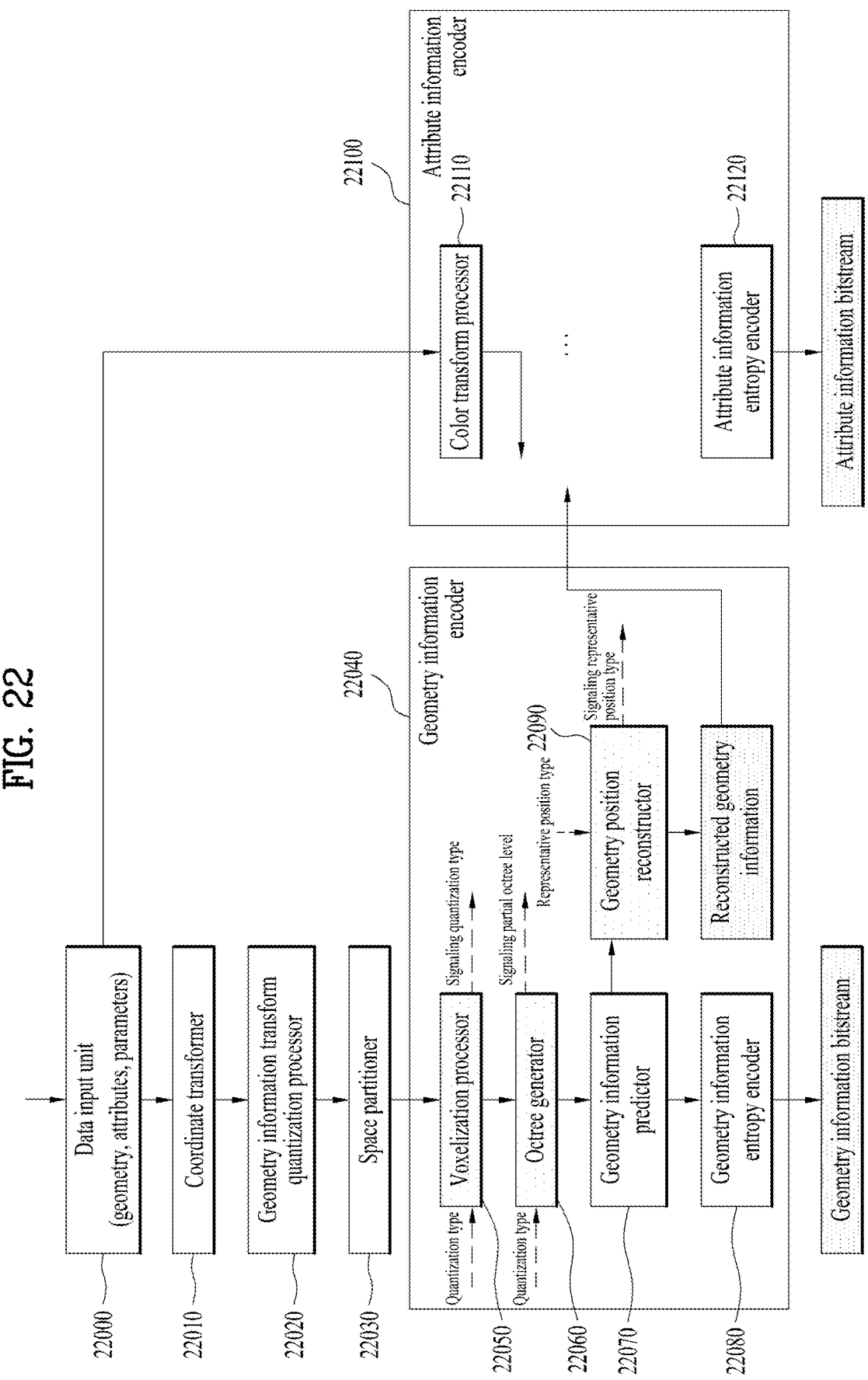
FIG. 22 shows a structure of a point cloud data encoder according to embodiments.

FIG. 22 shows a structure of a point cloud data encoder according to embodiments.

FIG. 22 shows a detailed block diagram of an encoder according to embodiments corresponding to the transmission device 10000 of FIG. 1, the point cloud video encoder 10002 of FIG. 1, the encoder 20001 of FIG. 2, the encoder of FIG. 4, the transmission device of FIG. 12, the XR device 1430 of FIG. 14, and the encoder 16020 of FIG. 16. Each element corresponds to hardware, software, a processor, and/or a combination thereof.

Each element of FIG. 22 may always be included in the encoder according to the embodiments, or may be selectively included in the encoder. Signaling information on the operation of the encoding elements of the encoder may be transmitted in the bitstream.

The transmission device according to the embodiments or the encoder included in the transmission device encodes point cloud data and generates a geometry information bitstream and/or an attribute information bitstream.

A data input unit 22000 may receive geometry data, attribute data, and/or parameters related thereto.

A coordinate transformer 22010 may transform coordinates related to the position (coordinate) information of the geometry data. The coordinate transformer 17010 may correspond to the coordinate transformer 40000 in FIG. 4.

A geometry information transform quantization processor 22020 may be referred to as a geometry information transform quantizer. The geometry information transform quantization processor 22020 may correspond to the quantizer 40001 in FIG. 4. The geometry information transformation quantization processor 22020 may receive one full scale value (quantization value) and adjust the scale according to distribution of content.

A space partitioner 22030 may partition the point cloud data into space partition units according to embodiments. The space partitioner 22030 may space-adaptively partition the data space using tiles, blocks, a density-based method, an axis-based method, an attribute-based method, a geometric-based method, or the like according to data characteristics of the point cloud data. The space partitioner 22030 may perform data partitioning. A frame may be partitioned into tiles and slices. Source point cloud data may be partitioned into a plurality of slices and encoded within a bitstream. A slice is a set of points that may be encoded or decoded independently. A slice may include one geometry data unit and zero or one or more attribute data units. Attribute data units may depend on corresponding geometry data in the same slice. In a slice, the geometry data unit may appear before the related attribute units. The data units in the slice are contiguous. A group of slices may be identified by a common tile identifier. Tile information describing a bounding box for each tile may be present in the bitstream. A tile may overlap other tiles in the bounding box. Each slice may include an index for identifying that a tile belongs thereto.

A geometry information encoder 22040 may encode geometry data of the point cloud data. The detailed process of geometry encoding may be performed by the following elements. The geometry information encoder 22040 may allow the octree generator to generate an octree based on the quantized point cloud and allow the color re-adjuster to use the generated octree.

In order to provide spatial scalability, the geometry information encoder 22040 (e.g., the octree generator 22060) may set a depth level of an octree to set points to be encoded from the set octree depth level.

The octree depth level applied to the partial geometry may be included as a parameter in the bitstream and signaled to the decoder. The octree depth level setting environment may be changed according to the usage purpose or computing performance of the decoder.

A voxelization processor 22050 may voxelize the geometry data. The voxelization processor 22050 may correspond to the voxelizer 40001 in FIG. 4.

The voxelization type may quantize geometry according to the quantization type setting according to embodiments (see FIGS. 18 and 19).

The quantization type applied to the geometry by the encoder according to the embodiments may be included in a bitstream as a parameter (signaling information) and transmitted to the reception device according to the embodiments.

As described above, the voxelization processor 22050 may signal the quantization type used in the lossy geometry coding to the decoder such that the quantization type may be used in the geometry position reconstructors 22090 and 23030 of the encoder and/or the decoder. The quantization type may include ceil, floor, or rounding.

An octree generator 22060 may correspond to the octree analyzer 40002 in FIG. 4. The octree generator 22060 may generate geometry data in an octree structure.

When a geometry octree is used, geometry encoding may be performed as follows: 1) A bounding box defined by two points may be defined. The octree structure is built by recursively subdividing the bounding box. Each cube is divided into 8 sub-cubes. The 8-bit code may be referred to as an occupancy code. One bit per sub-cube may be expressed as 1 when the point is occupied, or 0 when the point is empty. Sub-cubes whose side is greater than 1 are further divided. A sub-cube having the size of 1 may be a voxel. Multiple points may overlap and be mapped to the same sub-cube (voxel). The points of each sub-cube may be arithmetically encoded.

The decoding process may be started by reading the dimensions of the bounding box from the bitstream. The same octree structure may be generated by dividing the bounding box according to the occupancy codes. When the sub-cube of dimension 1 is reached, the points of the sub-cube may be arithmetically decoded.

The octree generator 22060 may generate an octree for geometry. It may generate an octree for the entire geometry or an octree for a part of the geometry.

Depending on the index of the depth level according to the embodiments, the octree generator 22060 may generate an octree including leaf nodes including all levels (16000) or may generate a partial octree including nodes up to a specific level (16010). The transmission device may include the depth level of the octree as a parameter (signaling information) in the bitstream and transmit the same to the reception device.

A geometry information predictor 22070 may perform prediction on geometry data. The geometry information predictor 22070 may generate a prediction value for the geometry data between a parent node and a child node in the octree structure. A residual bit value may be generated through the predicted value to perform entropy coding on the residual to construct a geometry bitstream. Efficient bitstream transmission may be implemented by coding only the residual for the predicted value. The geometry information predictor 22070 may reconstruct (reconfigure) the geometry data from the geometry octree for attribute coding. This is because attribute coding is performed based on the reconstructed geometry data.

The geometry information predictor 22070 may not always be executed. There are options for the operation. Geometry information prediction is performed according to an option value. For example, whether or not to perform the operation may be signaled by an Adjacent Child Neighbor flag.

The value generated through the geometry information predictor 22070 may indicate whether the current octree node is occupied. The value is transmitted and input to the geometry position reconstructor 22090.

Whether the input value to the geometry position reconstructor 22090 is an occupied bit predicted by the geometry information predictor 22070 is unimportant to the geometry position reconstructor 22090. That is, only whether the node is occupied is important to t the geometry position reconstructor 22090.

A geometry information entropy encoder 22080 may perform entropy coding on the geometry data to generate a geometry bitstream.

The geometry position reconstructor 22090 may reconstruct the geometry. That is, the geometry encoded by the geometry encoder 22040 may be reconstructed. The geometry position values are reconstructed. The reconstructed geometry position values are provided to the attribute encoder 22100.

The geometry position reconstructor 22090 may receive the representative position type of each octree node and reconstruct the geometry position values according to the representative position type (see FIG. 20). The representative position type used in the encoder may be included in a parameter in the bitstream and provided to the decoder. The representative position type may include use of a type such as the quantization type (see FIG. 19), selection of any corner position such as a left, bottom, front/right, bottom, front corner (see 20000 in FIG. 20), selection of the middle position (see 20010 of FIG. 20), and selection of the middle position.

The middle position refers to the center of a bounding box, which is a node region.

In selecting the position of a centroid, the geometry position reconstructor 22090 may analyze the distribution of the points and transmit, to the decoder, the index of a node at the lower level of the octree depth level to which the calculated centroid value belongs as signaling information (parameter) in a bitstream. For example, indices 0 to 7 of lower-level nodes may be transmitted.

In selecting the position of a centroid, the geometry position reconstructor 22090 may reconstruct geometry position values according to a representative position type of a position to be reconstructed based on a node index of a lower level at which the centroid is located. The representative position type may be included in a bitstream as parameter information and transmitted to the decoder. The representative position type may include use of a type such as the quantization type, selection of any corner position such as a left, bottom, front/right, bottom, front corner, selection of the middle position, and selection of the middle position.

According to the embodiments, the encoder may fully send the data and the decoder may partially decode the data. The encoder according to the embodiments may partially encode and transmit the data. When the encoder partially encodes and transmits data, the reconstruction operation performed by selecting a centroid position may additionally require an index of a lower level node because there is no additional information on a child node. Accordingly, the index of the lower level node may be transmitted to the decoder. Since there are a maximum of 8 sub-nodes, the encoder may transmit the index value of a sub-node corresponding to the centroid position value among the sub-nodes to the decoder.

The node index received in decoding becomes the centroid. When the encoder fully encodes and transmits data in full resolution, the decoder does not need to receive a node index of the lower level. This is because the decoder may find the lower level and obtain the centroid. However, when the encoder performs partial encoding rather than full resolution encoding, the decoder may receive the centroid point index and may set the same as the representative position value.

The attribute information encoder 22100 may encode attribute data.

The attribute information encoder 22100 may encode an attribute based on the geometry reconstructed according to the representative position type.

In case of partial encoding, an attribute may be encoded based on the representative position of a node of an octree based on the octree including up to a specific level.

The attribute information encoder 22100 may include the following elements.

A color transform processor 21100 may transform the color of the attribute data according to data characteristics.

When overlapping points are merged in the reconstructed geometry octree structure, the color re-adjuster (not shown) may perform recoloring, or perform RAHT attribute coding, or configure LOD according to prediction/lifting transform attribute coding.

The LOD configurator (not shown) may configure an LOD from the point cloud data. The LOD configurator may generate an LOD from the attribute data recolored based on the reconstructed geometry information (geometry data). When prediction/lift transform, not RAHT, is applied during attribute coding, an LOD may be generated.

A neighbor point set configurator (not shown) configures a neighbor point set for a point belonging to an LOD in the LOD and higher LODs based on the LOD.

After generating the $LOD_1$ set, X (>0) nearest neighbors may be found in a group at the same or lower LOD (a group in which the distance between nodes is long) based on the $LOD_1$ set, and be registered in the predictor as a neighbor point set.

Every point may have a single predictor. The attributes are predicted from the neighbor points registered in the predictor.

The predictors may be used to predict attributes. The average of the values obtained by multiplying the attributes of the registered neighbor points by a weight may be used as a predicted result, or a specific point may be used as the predicted result. Regarding which method to use, a compressed result value may be pre-calculated, and then a method capable of generating the smallest stream may be selected.

The residual between the attribute value of a point and an attribute value predicted by the predictor of the point may be encoded together with the method selected by the predictor and signaled to the receiver.

The decoder may decode the transmitted prediction method and predict an attribute value according to the method. The attribute value may be reconstructed by decoding the transmitted residual and adding the predicted value thereto.

An attribute information predictor (not shown) predicts an attribute value of a point from a set of neighbor points. For example, in encoding point Px, when a set of neighbor points of Px is configured, the attribute value of Px may be predicted based on the attribute values of the neighbor points in the set, a residual between the predicted attribute value and the attribute value of Px may be estimated, and the value of the residual may be encoded and transmitted to the decoder. The decoder configures a set of neighbor points of Px through LOD generation and the additional information received, predicts the attribute value of Px based on the attribute values of the neighbor points in the neighbor set, and reconstructs the attribute value of Px by adding the received residual to the predicted value.

A residual attribute information quantization processor (not shown) may generate a predicted value for attribute data, generate a residual between the predicted value and the attribute value, and quantize the value of the residual.

The attribute information entropy encoder 22120 may perform entropy coding on attribute data and generate an attribute bitstream. For example, the residual may be coded and an attribute bitstream may be generated.

The transmission device according to embodiments may generate signaling information (metadata) or parameters indicating an operation related to geometry encoding and/or attribute encoding. The transmission device according to the embodiments may generate and transmit a bitstream containing the encoded geometry data, encoded attribute data, related metadata, and the like (see FIGS. 24 to 31).

A point cloud data transmission method according to embodiments may include encoding point cloud data, and transmitting a bitstream containing the point cloud data.

The encoding of the point cloud data according to the embodiments may include encoding geometry data of the point cloud data, and encoding attribute data of the point cloud data.

The encoding of the attribute data according to the embodiments may include generating Levels of Details (LODs) based on point cloud data, searching for nearest neighbor points for a current point from LODs, and generating a predicted value for an attribute value of the current point based on the nearest neighbor points, and encoding a residual between the attribute value of the current point and the predicted value.

The encoding of the geometry according to the embodiments may include voxelizing the geometry or representing the geometry based on an octree.

The encoding according to the embodiments may further include reconstructing a position of the geometry. The reconstructing of the position of the geometry may reconstruct the position of the geometry up to a specific level of the octree based on the octree for the geometry.

The reconstructing of the position of the geometry according to the embodiments may reconstruct the position of the geometry based on a center position of each octree node for a specific level.

Figure 23:
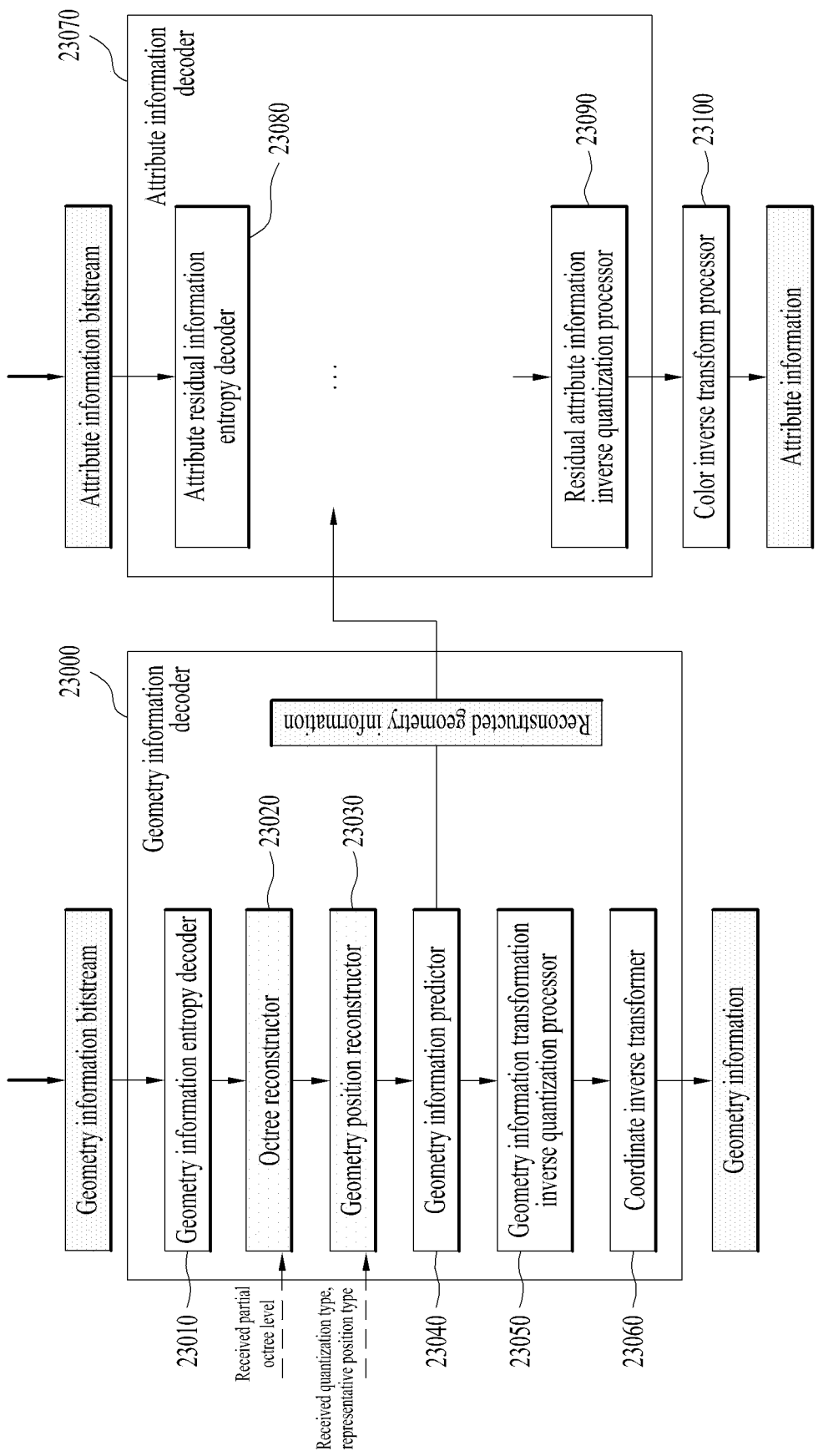
FIG. 23 shows a structure of a point cloud data decoder according to embodiments.

FIG. 23 shows a structure of a point cloud data decoder according to embodiments.

The decoder of FIG. 23 may correspond to or be combined with the point cloud video decoder 10006 of the reception device 10004 of FIG. 1, the decoding 20003 of FIG. 2, the decoder of FIGS. 10 and 11, the reception device of FIG. 13 configured to decode the geometry bitstream and the attribute bitstream, and the XR device 1430 of FIG. 14 configured to process point cloud data. Each element may correspond to hardware, software, a processor, and/or a combination thereof.

Each element of FIG. 23 may always be included in the encoder according to the embodiments, or may be selectively included in the encoder. An operation of each element of the decoder may be performed based on signaling information about the operations of the encoding elements of the encoder.

The reception device according to the embodiments or the decoder included in the reception device may receive a bitstream. The bitstream contains coded geometry data, coded attribute data, and related metadata. The reception device according to the embodiments decodes and reconstructs point cloud data based on the bitstream and/or the metadata (parameters) related to geometry encoding and the metadata (parameters) related to attribute encoding contained in the bitstream.

A geometry information decoder 23000 may receive a geometry information bitstream and decode the geometry information. The geometry information decoder 23000 may be a decoder on the receiving side corresponding to the geometry information encoder 22040 on the transmitting side. The geometry information decoder 23000 may perform a reverse process of the operation of the geometry information encoder 22040.

A geometry information entropy decoder 23010 may receive the geometry information bitstream and decode the geometry information based on the entropy scheme. The geometry information entropy decoder 23010 may perform a reverse process of the operation of the geometry information entropy encoder 22080.

An octree reconstructor 23020 may reconstruct an octree from the geometry information. The octree reconstructor 23020 may perform a reverse process of the operation of the octree generator 22060.

The octree reconstructor 23020 may construct and decode points to be attribute-decoded from the reconstructed octree depth level for partial geometry decoding.

The octree reconstructor 23020 may generate a full or partial octree based on information related to a partial octree level contained in the received bitstream.

The geometry position reconstructor 23030 may reconstruct the position value of a node reconstructed according to the occupancy bits in an octree partially decoded through the restored quantization type or the restored representative position type.

The geometry position reconstructor 23030 may reconstruct a geometry position based on information related to a quantization type and a representative position type included in the received bitstream.

A geometry information predictor 23040 may generate a predicted value of the geometry information. For example, an inter-node predicted value may be generated in the octree structure, and the geometry information may be efficiently decoded using a residual for the predicted value. The geometry information predictor 23040 may perform a reverse process of the operation of the geometry information predictor 22070.

A geometry information transformation inverse quantization processor 23050 may inversely quantize geometry data. For example, the geometry information transformation inverse quantization processor 23050 may acquire a scale value (quantization value) from the signaling information (parameter) contained in the bitstream, and may apply inverse quantization to the geometry information reconstructed based on the scale value.

A coordinate inverse transformer 23060 may inversely transform coordinate information about the geometry information. The coordinate inverse transformer 23060 may perform a reverse process of the operation of the coordinate transformer 22010.

The attribute information decoder 23070 may receive an attribute information bitstream and decode the attribute information. The attribute information decoder 23070 may perform a reverse process of the operation of the attribute information encoder 22100.

The attribute residual information entropy decoder 23080 may decode attribute residual information (e.g., a residual for attribute information) contained in the attribute information bitstream based on the entropy scheme. The attribute residual information entropy decoder 23080 may perform a reverse process of the operation of the attribute information entropy encoder 22120.

The attribute information decoder 23070 may further include the following elements.

An LOD configurator (not shown) may configure an LOD from point cloud data. The LOD configurator 22080 may generate an LOD from the attribute data re-adjusted in color based on the reconstructed geometry information (geometry data). When prediction/lift transform, not RAHT, is applied during attribute coding, an LOD may be generated. The LOD configurator may correspond to the LOD configurator included in the attribute information encoder of FIG. 22.

The neighbor point set configurator (not shown) may search for neighbor points of points included in the LODs based on the LOD generated from the attribute information bitstream and register the same as a neighbor point set. The neighbor point set configurator may correspond to the neighbor point set configurator included in the attribute information encoder of FIG. 22.

The attribute information predictor (not shown) may generate a predicted value for the attribute information. For example, the attribute information predictor may generate a predicted value for a point from the LODs and the set of neighbor points, and generate a residual for the predicted value. The attribute information predictor may perform a reverse process of the operation of the attribute information predictor included in the attribute information encoder of FIG. 22.

The residual attribute information inverse quantization processor 23090 may inversely quantize the residual attribute information, for example, a residual for the attribute information. The residual attribute information inverse quantization processor 23090 may perform a reverse process of the operation of the residual attribute information quantization processor included in the attribute information encoder of FIG. 22.

A color inverse transform processor 23100 may inversely transform color information, which is attribute information. The color inverse transform processor 23100 may perform a reverse process of the operation of the color transform processor 22100.

A point cloud data reception device according to embodiments may include a receiver configured to receive a bitstream containing point cloud data, and a decoder configured to decode the bitstream.

According to embodiments, the decoder configured to decode point cloud data includes a geometry decoder configured to decode geometry data for the point cloud data, and an attribute decoder configured to decode attribute data for the point cloud data.

According to embodiments, the attribute decoder configured to decode the attribute data generates Levels of Details (LODs) based on the point cloud data, searches for nearest neighbor points for a current point from the LODs, generates a predicted value for an attribute value of the current point based on the nearest neighbor points, and reconstructs the point cloud data based on the predicted value and a residual for the point cloud data, wherein the predicted value is generated based on a prediction mode.

The geometry decoder configured to decode geometry according to embodiments may represent geometry based on an octree.

The decoder according to the embodiments may reconstruct the positions of the geometry up to a specific level of the octree based on the octree for the geometry.

The decoder according to the embodiments may reconstruct the positions of the geometry based on the middle position of each octree node at a specific level.

Figure 24:
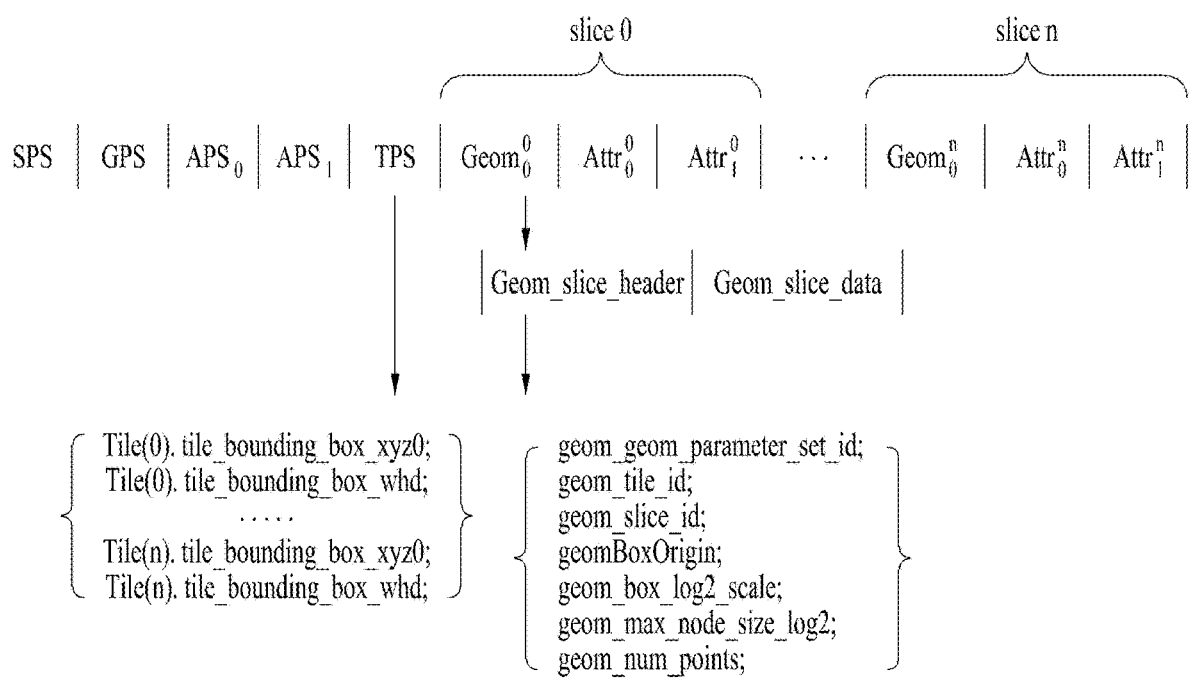
FIG. 24 shows a structure of a bitstream related to point cloud data according to embodiments.

FIG. 24 shows a structure of a bitstream related to point cloud data according to embodiments.

FIG. 24 shows the structure of a bitstream generated by the point cloud video encoder 10002 of the transmission device 10000 of FIG. 1, the encoding 20001 of FIG. 2, the encoder of FIG. 4, the transmission device of FIG. 12, the XR device of FIG. 14, the encoder of FIG. 22, or the like.

The bitstream of FIG. 24 may be received and decoded by the point cloud video decoder 10006 of the reception device 10004 of FIG. 1, the decoding 20003 of FIG. 2, the decoder of FIGS. 10 and 11, the reception device of FIG. 13, the XR device of FIG. 14, the decoder of FIG. 23, or the like.

The method/device according to the embodiments may encode point cloud data, generate related information, and transmit/receive the related information in a bitstream. For example, a point cloud data encoder configured to perform geometry encoding and/or attribute encoding may generate an encoded point cloud (or a bitstream containing a point cloud) as described below. In addition, signaling information on the point cloud data may be generated and processed by the metadata processor of the point cloud data transmission device and included in the point cloud as described below.

The signaling information according to the embodiments may be generated and transmitted by the transmission/reception device according to the embodiments, for example, the metadata processor 12007 (which may be referred to as a metadata generator, or the like) of the transmission device, and may be received and acquired by the metadata parser 13006 of the reception device. Each operation of the reception device according to the embodiments may be performed based on the signaling information.

The following abbreviations are used in the present disclosure: SPS (Sequence Parameter Set); GPS (Geometry Parameter Set); APS (Attribute Parameter Set); TPS (Tile Parameter Set); Geom (Geometry Bitstream (Geometry bitstream=geometry slice header+geometry slice data)); Attr (Attribute bitstream (=attribute brick (slice) header+attribute brick (slice) data)). Here, the brick may be referred to as a block, a slice, or the like.

The point cloud data according to the embodiments may take the form of a bitstream as shown in FIG. 24. The point cloud data may contain a sequence parameter set (SPS), a geometry parameter set (GPS), an attribute parameter set (APS), and a tile parameter set (TPS) containing signaling information according to embodiments. The point cloud data may contain one or more geometries and/or attributes. The geometry and/or attributes in the point cloud data may be divided into one or more slices (or bricks/blocks). The geometry may have a structure of a geometry slice header and geometry slice data. For example, the TPS containing signaling information may include Tile(0)_tile_bounding_box_xyz0 and Tile(0)_tile_bounding_box_whd. The geometry may include geom_geom_parameter_set_id, geom_tile_id, geom_slice_id, geomBoxOrigin, geom_box_log2_scale, geom_max_node_size_log2, and geom_num_points.

The signaling information according to the embodiments may be added to the SPS, GPS, APS, TPS, or the like and signaled.

According to embodiments, the signaling information may be added to the TPS, the geometry (Geom) for each slice, or the attribute (Attr) for each slice and signaled.

The structure of the point cloud data according to the embodiments may efficiently provide parameter set(s), geometry(s), and attribute(s) including signaling information in terms of encoding/decoding/data.

The point cloud data related to the point cloud data transmission/reception device according to the embodiments may contain at least one of a sequence parameter, a geometry parameter, an attribute parameter, a tile parameter, a geometry bitstream, or an attribute bitstream.

Hereinafter, syntax of specific signaling information will be described with reference to the drawings. For reference, the name of the signaling information according to the embodiments may be changed/extended within the scope of intended meanings/functions of the signaling information. The field of signaling information may be distinguishably referred to as first signaling information, second signaling information, or the like.

As described above, the point cloud data transmission device may transmit encoded point cloud data in the form of a bitstream. According to embodiments, the bitstream may include one or more sub-bitstreams.

The point cloud data transmission device divides an image of the point cloud data into one or more packets in consideration of an error of a transmission channel, and be transmitted over a network. A bitstream according to embodiments may contain one or more packets (e.g., network abstraction layer (NAL) units). Accordingly, even when some packets are lost in a poor network environment, the point cloud data reception device may reconstruct the image using the remaining packets. The point cloud data may divided into one or more slices or one or more tiles and processed. The tiles and slices according to embodiments are regions for partitioning a picture of the point cloud data and processing the same through point cloud compression coding. The point cloud data transmission device may provide high-quality point cloud content by processing data corresponding to each region according to the importance of each divided region of the point cloud data. That is, the point cloud data transmission device according to the embodiments may process data corresponding to a region important to a user through point cloud compression coding with better compression efficiency and appropriate latency.

An image (or picture) of point cloud content according to embodiments is partitioned into basic processors for point cloud compression coding. The basic processor for point cloud compression coding according to the embodiments may include a coding tree unit (CTU) and a brick, but is not limited to this example.

A slice according to embodiments is a region including basic processors for one or more point cloud compression codings, and does not have a rectangular shape. The slice according to the embodiments contains data transmitted through a packet. A tile according to embodiments is a region partitioned in a rectangular shape in the image and includes basic processors for one or more point cloud compression codings. One slice according to embodiments may be included in one or more tiles. Also, one tile according to embodiments may be included in one or more slices.

A bitstream according to embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and one or more slices.

The SPS according to the embodiments may be encoding information for an entire sequence such as a profile and a level, and may include comprehensive information about the entire file, such as picture resolution and video format.

One slice according to embodiments (e.g., slice 0) contains a slice header and slice data. The slice data may include one geometry bitstream Geom00 and one or more attribute bitstreams Attr00 and Attr10. The geometry bitstream may contain a header (e.g. geometry slice header) and a payload (e.g. geometry slice data). The header of the geometry bitstream according to the embodiments may contain identification information (geom_geom_parameter_set_id) about a parameter set included in the GPS, a tile identifier (geom_tile_id), slice identifier (geom_slice_id), origin information about a geometry box (geomBoxOrigin), a geometry box scale (geom_box_log2_scale), a max geometry node size (geom_max_node_size_log2), the number of geometry points (geom_num_points), and information about data contained in the payload. The attribute bitstream may contain a header (e.g. an attribute slice header or an attribute brick header) and a payload (e.g., attribute slice data or attribute brick data).

Related information may be signaled to implement embodiments. Signaling information according to embodiments may be used at the transmitting side or the receiving side.

Geometry data (Geom): Geometry bitstream=geometry slice header+geometry slice data Attribute data (Attr): Attribute bitstream=attribute brick header+attribute brick data. According to embodiments, a brick may be referred to as a slice (brick=slice).

The method/device according to the embodiments may add option information related to predictor selection according to the embodiments to the SPS or APS and transmit the same.

The method/device according to the embodiments may add the option information related to predictor selection to the TPS or the Attribute header for each slice and transmit the same.

The method/device according to the embodiments may partition data into tiles or slices such that the point cloud may be divided and processed by regions, and may generate and transmit signaling information for each tile/slice.

In dividing the point cloud into regions, an option of generating a different neighbor point set for each region may be set, such that low complexity is obtained although the reliability of the result is somewhat low, or that high reliability is obtained although the complexity is high. This may be set differently according to the processing capacity of the receiver.

The method/device according to the embodiments may signal, in the SPS and/or GPS, the geometry point reconstruction-related information for a spatial scalability function used in the process of encoding and/or decoding the geometry.

The method/device according to the embodiments may signal, in the TPS and/or Geom_slice_header for each slice, the geometry point reconstruction-related information for the spatial scalability function used in the process of encoding and/or decoding the geometry.

Since different geometry encoding may be performed according to a specific region in a 3D space, different geometry position reconstruction methods may be used when the method/device according to the embodiments divides point cloud data by region.

Accordingly, when the method/device according to the embodiments divides the point cloud into tiles, a different geometry position reconstruction method may be applied for each tile.

When the method/device according to the embodiments divides the point cloud into slices, a different geometry position reconstruction method may be applied for each slice.

The method/device according to the embodiments may add centroid position information obtained through distribution analysis for a partially encoded node of the geometry (Geom) to a geometry node and signal the same.

Hereinafter, syntax or definition of specific information (element) included in a bitstream will be described.

FIG. 25 shows a sequence parameter set (SPS) according to embodiments.

The SPS shown in FIG. 25 is included in FIG. 23.

The SPS according to the embodiments may include information used in reconstructing a point of geometry for encoding and/or decoding for spatial scalability of the geometry.

profile_idc indicates a profile to which the bitstream according to the embodiments conforms. Bitstreams may not contain values of profile_idc other than those specified in the embodiments. The values of profile_idc may be reserved for future use by ISO/IEC.

profile_compatibility_flags equal to 1 indicates that the bitstream conforms to the profile indicated by profile_idc equal to j.

sps_num_attribute_sets indicates the number of coded attributes in the bitstream. The value of sps_num_attribute_sets may be in the range of 0 to 63.

The following elements for an attribute may be included in the SPS according to sps_num_attribute_sets.

attribute_dimension[i] specifies the number of components of the i-th attribute.

attribute_instance_id[i] specifies the instance ID for the i-th attribute.

spatial_scalability_LOD may indicate an encoded octree depth level for supporting spatial scalability.

spatial_scalability_geom_quantization_type may indicate a geometry quantization type.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the SPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

FIG. 26 shows a geometry parameter set (GPS) according to embodiments.

The GPS of FIG. 26 corresponds to the GPS of FIG. 24.

The GPS according to the embodiments may include information used in reconstructing a point of geometry for encoding and/or decoding for spatial scalability of the geometry.

spatial_scalability_LOD may indicate an encoded octree depth level for supporting spatial scalability.

spatial_scalability_geom_quantization_type may indicate a geometry quantization type.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the GPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

spatial_scalability_tile_based_geom_reconstruction_flag is a flag indicating whether different geometry reconstruction schemes are applied on a tile-by-tile basis.

gps_geom_parameter_set_id provides an identifier for the GPS for reference by other syntax elements. The value of gps_seq_parameter_set_id may be in the range of 0 to 15, inclusive.

gps_seq_parameter_set_id specifies the value of sps_seq_parameter_set_id for the active SPS. The value of gps_seq_parameter_set_id may be in the range of 0 to 15, inclusive.

FIG. 27 shows a tile parameter set (TPS) according to embodiments.

FIG. 27 corresponds to the TPS of FIG. 24.

The TPS according to the embodiments may include information used in reconstructing a point of geometry for encoding and/or decoding for spatial scalability of the geometry.

When spatial_scalability_tile_based_geom_reconstruction_flag is equal to 'true', the following elements are included in the TPS.

spatial_scalability_LOD may indicate an encoded octree depth level applied to a tile for supporting spatial scalability.

spatial_scalability_geom_quantization_type may indicate a geometry quantization type applied to a tile.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node applied to a tile.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the TPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

spatial_scalability_slice_based_geom_reconstuction_flag is a flag indicating whether different geometry reconstruction schemes are applied on a slice-by-slice basis.

num_tiles specifies the number of tiles signaled for the bitstream. When not present, num_tiles may be inferred to be 0.

Tile bounding box offset elements described below may be carried in the TPS according to num_tiles.

tile_bounding_box_offset_x[i] may indicate the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the Cartesian coordinates. When not present, the value of tile_bounding_box_offset_y[0] may be inferred to be sps_bounding_box_offset_y.

tile_bounding_box_offset_z[i] indicates the z offset of the i-th tile in the Cartesian coordinates. When not present, the value of tile_bounding_box_offset_z[0] may be inferred to be sps_bounding_box_offset_z.

FIG. 28 shows a geometry slice header (GSH) according to embodiments.

FIG. 28 corresponds to the GSH of FIG. 24.

The GSH according to the embodiments may include information used in reconstructing a point of geometry for encoding and/or decoding for spatial scalability of the geometry.

When spatial_scalability_slice_based_geom_reconstruction_flag is equal to 'true', the following elements may be included in the GSH.

spatial_scalability_LOD may indicate an encoded octree depth level applied to a slice for supporting spatial scalability.

spatial_scalability_geom_quantization_type may indicate a geometry quantization type applied to a slice.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node applied to a slice.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the GSH.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

gsh_geometry_parameter_set_id specifies the value of gps_geom_parameter_set_id of the active GPS.

gsh_tile_id specifies the value of the tile id that may be referred to by the GSH. The value of gsh_tile_id shall be in the range of 0 to XX, inclusive.

gsh_slice_id identifies the slice header for reference by other syntax elements. The value of gsh_slice_id may be in the range of 0 to XX, inclusive.

FIG. 29 shows a geometry node according to embodiments.

FIG. 29 shows node information about geometry contained in the bitstream of FIG. 24.

In the process of reconstructing a point of geometry for spatial scalability during geometry encoding and/or decoding, the method/device according to the embodiments may add centroid related information to the geometry node when the representative position type is the centroid.

child_occupancy_idx: In reconstructing the geometry position based on the centroid calculated through distribution, child_occupancy_idx indicates the position of a node to which the centroid belongs. The node position may correspond to the index of a child node. For example, it may have a value of 0 to 7.

single_occupancy_flag: When equal to 1, single_occupancy_flag indicates that the current node includes a single child node. When equal to 0, single_occupancy_flag indicates that the current node includes multiple child nodes.

When spatial_scalability_geom_position_type is equal to 10 (centroid), the geometry node may include a child occupancy index.

The method/device according to the embodiments may provide effects such as spatial scalability based on the operation and signaling information according to the embodiments.

Spatial scalability is a function capable of sending and processing a point cloud of low resolution when the point cloud data is dense and the bandwidth is low. It is also a function capable of providing a low-resolution point cloud by decoding the bitstream only up to a specific depth level of the octree rather than decoding the entire received octree-based bitstream when the point cloud data is dense and the entire octree stream is received, but the decoder lacks the capacity or resources of the decoder, or requires thumbnails preferentially and quickly according to the scenario.

In order to provide the spatial scalability effect in the G-PCC geometry encoding/decoding process of the embodiments, operations of constructing a partial octree and reconstructing a position from the constructed last-level octree nodes are provided.

The proposed method of reconstructing a point of the octree nodes may increase the compression efficiency of partially encoded/decoded geometry for spatial scalability depending on the position into which the geometry is reconstructed.

Accordingly, in the present disclosure, a geometry compression method for providing the spatial scalability function of a geometry-based point cloud compression (G-PCC) encoder/decoder for compressing 3D point cloud data may be provided, and the geometry compression efficiency may be increased.

The method/device (transmission method/device and/or reception method/device) according to the embodiments may provide various geometry position reconstruction methods for spatial scalability, thereby efficiently encoding/decoding various types of point cloud data.

Referring to FIG. 20, in reconstructing geometry, the method/device according to the embodiments may set a centroid differently for each LOD level. That is, in the case of FIG. 20, the geometry is reconstructed based on the representative position of the nodes from LOD 0 to a specific level (LOD N) based on one type of centroid setting method. In other embodiments, different types of centroid setting methods may be applied in various ways for the respective LOD levels. That is, operation S21040 may be variously performed for each LOD level. The transmission device and/or the encoder according to the embodiments may analyze the centroid for each LOD and transmit information indicating the centroid analysis method for each LOD to the reception device and/or decoder according to the embodiments.

All schemes for the representative position type according to the embodiments may be applied for each LOD and may be signaled to the decoder.

Operation 21020 (geometry position reconstruction) according to the embodiments may be performed for each LOD of an octree.

FIG. 30 shows an SPS according to embodiments.

FIG. 30 may correspond to the SPS of FIG. 25.

For the definition of the elements included in FIG. 30, reference may be made to the description of the corresponding elements of FIG. 25.

The SPS according to the embodiments may include information used in reconstructing a point of geometry for encoding and/or decoding for spatial scalability of the geometry.

profile_idc indicates a profile to which the bitstream according to the embodiments conforms. Bitstreams may not contain values of profile_idc other than those specified in the embodiments. The values of profile_idc may be reserved for future use by ISO/IEC.

profile_compatibility_flags equal to 1 indicates that the bitstream conforms to the profile indicated by profile_idc equal to j.

sps_num_attribute_sets indicates the number of coded attributes in the bitstream. The value of sps_num_attribute_sets may be in the range of 0 to 63.

The following elements for an attribute may be included in the SPS according to sps_num_attribute_sets.

attribute_dimension[i] specifies the number of components of the i-th attribute.

attribute_instance_id[i] specifies the instance ID for the i-th attribute.

spatial_scalability_LOD may indicate an encoded octree depth level for supporting spatial scalability.

spatial_scalability_geom_quantization_type may indicate a geometry quantization type.

For example, spatial_scalability_geom_quantization_type equal to 0 may indicate the rounding method. spatial_s- calability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the SPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

octree_height_depth indicates the octree height.

analyzed_distribution_at_depth indicates the result value for the centroid position obtained by analyzing the distribution of points at each octree depth. Specifically, analyzed_distribution_at_depth may indicate an octree child node-based index.

For example, when analyzed_distribution_at_depth is equal to 1, the centroid position is the left-bottom-front position. When analyzed_distribution_at_depth is equal to 2, the centroid position is the left-bottom-back position. When analyzed_distribution_at_depth is equal to 3, the centroid position is the left-top-front position. When analyzed_distribution_at_depth is equal to 4, the centroid position is the left-top-back position. When analyzed_distribution_at_depth is equal to 5, the centroid position is the right-bottom-front position. When analyzed_distribution_at_depth is equal to 6, the centroid position is the right-bottom-back position. When analyzed_distribution_at_depth is equal to 7, the centroid position is the right-top-front position. When analyzed_distribution_at_ depth is equal to 8, the centroid position is the right-top-back position.

FIG. 31 shows a GPS according to embodiments.

FIG. 31 may correspond to the GPS of FIG. 26.

For the definition of the elements included in FIG. 31, reference may be made to the description of the corresponding elements of FIG. 26.

The GPS according to the embodiments may include information used in reconstructing a point of geometry for encoding and/or decoding for spatial scalability of the geometry.

spatial_scalability_LOD may indicate an encoded octree depth level for supporting spatial scalability.

spatial_scalability_geom_quantization_type may indicate a geometry quantization type.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geom_position_type may indicate a method of reconstructing a geometry position belonging to a node.

For example, when spatial_scalability_geom_position_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the GPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

spatial_scalability_tile_based_geom_reconstruction_flag is a flag indicating whether different geometry reconstruction schemes are applied on a tile-by-tile basis.

spatial_scalability_per_LOD_flag is a flag indicating whether to apply a different geometry reconstruction scheme for each octree depth.

octree_height_depth indicates the octree height.

gps_geom_parameter_set_id provides an identifier for the GPS for reference by other syntax elements. The value of gps_seq_parameter_set_id may be in the range of 0 to 15, inclusive.

gps_seq_parameter_set_id specifies the value of sps_seq_parameter_set_id for the active SPS. The value of gps_seq_parameter_set_id may be in the range of 0 to 15, inclusive.

FIG. 32 shows a TPS according to embodiments.

FIG. 32 corresponds to the TPS of FIG. 27.

For the definition of the elements included in FIG. 32, reference may be made to the description of the corresponding elements of FIG. 27.

The TPS according to the embodiments may include information used in reconstructing a point of geometry for encoding and/or decoding for spatial scalability of the geometry.

When spatial_scalability_tile_based_geom_reconstruction_flag is equal to 'true', the following elements are included in the TPS.

spatial_scalability_LOD may indicate an encoded octree depth level applied to a tile for supporting spatial scalability.

spatial_scalability_geom_quantization_type may indicate a geometry quantization type applied to a tile.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node applied to a tile.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_ type is equal to 10, the geometry position may be reconstructed as a child node position with a centroid calculated through distribution.

When spatial_scalability_geomposition_type is equal to 10, spatial_scalability_geom_centroid_position_type is included in the TPS.

When the geometry position is reconstructed as a centroid calculated through the distribution, spatial_scalability_geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

spatial_scalability_slice_based_geom_reconstuction_flag is a flag indicating whether different geometry reconstruction schemes are applied on a slice-by-slice basis.

spatial_scalability_per_LOD_flag is a flag indicating whether to apply a different geometry reconstruction scheme for each octree depth.

octree_height_depth indicates the octree height.

num_tiles specifies the number of tiles signaled for the bitstream. When not present, num_tiles may be inferred to be 0.

Tile bounding box offset elements described below may be carried in the TPS according to num_tiles.

tile_bounding_box_offset_x[i] may indicate the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the Cartesian coordinates. When not present, the value of tile_bounding_box_offset_y[0] may be inferred to be sps_bounding_box_offset_y.

tile_bounding_box_offset_z[i] indicates the z offset of the i-th tile in the Cartesian coordinates. When not present, the value of tile_bounding_box_offset_z[0] may be inferred to be sps_bounding_box_offset_z.

FIG. 33 shows a GSH according to embodiments.

FIG. 33 corresponds to the GSH of FIG. 28.

For the definition of the elements included in FIG. 32, reference may be made to the description of the corresponding elements of FIG. 28.

The GSH according to the embodiments may include information used in reconstructing a point of geometry for encoding and/or decoding for spatial scalability of the geometry.

When spatial_scalability_slice_based_geom_reconstruction_flag is equal to 'true', the following elements may be included in the GSH.

spatial_scalability_LOD may indicate an encoded octree depth level applied to a slice for supporting spatial scalability.

spatial_scalability_geom_quantization_type may indicate a geometry quantization type applied to a slice.

For example, spatial_scalability_geom_quantization_type equal to 0 may indicate the rounding method. spatial_scalability_geom_quantization_type equal to 1 may indicate the ceil method. spatial_scalability_geom_quantization_type equal to 2 may indicate the floor method. The integer values for the indication information may be changed in variously ways according to embodiments.

spatial_scalability_geomposition_type may indicate a method of reconstructing a geometry position belonging to a node applied to a slice.

For example, when spatial_scalability_geomposition_type is equal to 0, the geometry position reconstruction method is the same as the quantization type. In the case of rounding, the geometry may be reconstructed as a center. In the case of the ceil method, the geometry may be reconstructed as a right-top-back position. When spatial_scalability_geomposition_type is equal to 1, the geometry position may be reconstructed as a left-bottom-front position. When spatial_scalability_geomposition_type is equal to 2, the geometry position may be reconstructed as a left-bottom-back position. When spatial_scalability_geomposition_type is equal to 3, the geometry position may be reconstructed as a left-top-front position. When spatial_scalability_geomposition_type is equal to 4, the geometry position may be reconstructed as a left-top-back position. When spatial_scalability_geomposition_type is equal to 5, the geometry position may be reconstructed as a right-bottom-front position. When spatial_scalability_geomposition_type is equal to 6, the geometry position may be reconstructed as a right-bottom-back position. When spatial_scalability_geomposition_type is equal to 7, the geometry position may be reconstructed as a right-top-front position. When spatial_scalability_geomposition_type is equal to 8, the geometry position may be reconstructed as a right-top-back position. When spatial_scalability_geomposition_type is equal to 9, the geometry position may be reconstructed as a middle/center position. When spatial_scalability_geomposition_type is equal to 10, the geometry position may be reconstructed as a child node position with a centroid calculated through distribution.

When spatial_scalability_geomposition_type is equal to 10, spatial_scalability_geom_centroid_position_type is included in the GSH.

When the geometry position is reconstructed as a centroid calculated through the distribution, spatial_scalability_ geom_centroid_position_type may indicate a method of reconstructing the position of a node to which the centroid belongs.

For example, spatial_scalability_geom_centroid_position_type is equal to 0, the position of the node to which the centroid belongs may be reconstructed in the same method as the quantization type. When the quantization type is rounding, the position of the node may be reconstructed by constructing a center. When the quantization type is the ceil method, the position of the node may be reconstructed by constructing the right-top-back position. When spatial_scalability_geom_centroid_position_type is equal to 1, the position of the node to which the centroid belongs may be constructed as the left-bottom-front position. When spatial_scalability_geom_centroid_position_type is equal to 2, the position of the node to which the centroid belongs may be constructed as the left-bottom-back position. When spatial_scalability_geom_centroid_position_type is equal to 3, the position of the node to which the centroid belongs may be constructed as the left-top-front position. When spatial_scalability_geom_centroid_position_type is equal to 4, the position of the node to which the centroid belongs may be constructed as the left-top-back position. When spatial_scalability_geom_centroid_position_type is equal to 5, the position of the node to which the centroid belongs may be constructed as the right-bottom-front position. When spatial_scalability_geom_centroid_position_type is equal to 6, the position of the node to which the centroid belongs may be constructed as the right-bottom-back position. When spatial_scalability_geom_centroid_position_type is equal to 7, the position of the node to which the centroid belongs may be constructed as the right-top-front position. When spatial_scalability_geom_centroid_position_type is equal to 8, the position of the node to which the centroid belongs may be constructed as the right-top-back position. When spatial_scalability_geom_centroid_position_type is equal to 9, the position of the node to which the centroid belongs may be constructed as the middle/center position.

spatial_scalability_per_LOD_flag is a flag indicating whether to apply a different geometry reconstruction scheme for each octree depth.

octree_height_depth indicates the octree height.

gsh_geometry_parameter_set_id specifies the value of gps_geom_parameter_set_id of the active GPS.

gsh_tile_id specifies the value of the tile id that may be referred to by the GSH. The value of gsh_tile_id shall be in the range of 0 to XX, inclusive.

gsh_slice_id identifies the slice header for reference by other syntax elements. The value of gsh_slice_id may be in the range of 0 to XX, inclusive.

Figure 34:
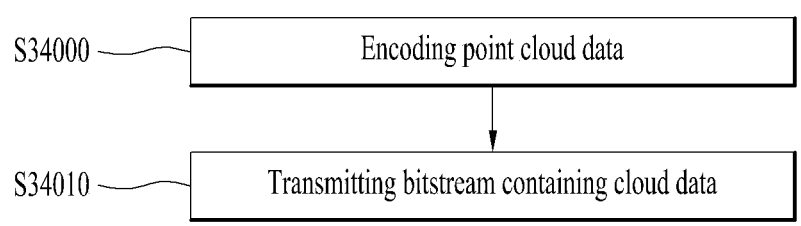
FIG. 34 illustrates a method for transmitting point cloud data according to embodiments.

FIG. 34 illustrates a method for transmitting point cloud data according to embodiments.

S34000: The point cloud data transmission method according to the embodiments may include encoding point cloud data. The encoding operation according to the embodiments may include the transmission device 10000 of FIG. 1, the point cloud video encoder 10002 of FIG. 1, the encoding 20001 of FIG. 2, the encoder of FIG. 4, the point cloud data processing of the transmission device of FIG. 12, The XR device 1430 of FIG. 14, the point cloud data encoding of FIGS. 15 and 16, the geometry encoding of FIGS. 18 to 20, the encoder of FIG. 22, and the bitstream generation and encoding of FIGS. 24 and 33.

S34010: The point cloud data transmission method according to the embodiments may further include transmitting a bitstream containing the point cloud data. The transmission operation according to the embodiments may include the operation of the transmitter 10003 of FIG. 1 and the transmission 20002 of FIG. 2.

Figure 35:
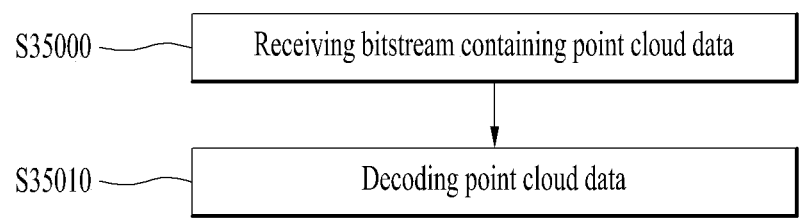
FIG. 35 illustrates a method for receiving point cloud data according to embodiments.

FIG. 35 illustrates a method for receiving point cloud data according to embodiments.

S35000: The point cloud data reception method according to the embodiments includes receiving a bitstream containing point cloud data. The reception operation according to the embodiments may include operations of the reception device 10004 of FIG. 1, the receiver 10005 of FIG. 1, the reception 20002 of FIG. 2 according to transmission, and the bitstream reception of FIGS. 24 to 33.

S35010: The method of receiving point cloud data according to the embodiments may further include decoding the point cloud data. The decoding operation according to the embodiments may include the operations of the point cloud video decoder 10006 of FIG. 1, the decoding 20003 of FIG. 2, the rendering 20004 of FIG. 2, the decoder of FIGS. 10 and 11, the point cloud data processing of the reception device of FIG. 13, the XR device 1430 of FIG. 14, the point cloud data decoding of FIGS. 16 and 17, the geometry decoding of FIG. 21, the decoder of FIG. 23, and the bitstream decoding of FIGS. 24 to 33.

Spatial scalability is a function capable of sending and processing a point cloud of low resolution when the point cloud data is dense and the bandwidth is low. It is also a function capable of providing a low-resolution point cloud by decoding the bitstream only up to a specific depth level of the octree rather than decoding the entire received octree-based bitstream when the point cloud data is dense and the entire octree stream is received, but the decoder lacks the capacity or resources of the decoder, or requires thumbnails preferentially and quickly according to the scenario.

A method for constructing a partial octree and reconstructing a position from the constructed last-level octree nodes in order to provide the spatial scalability function in the G-PCC geometry encoding/decoding process of the embodiments has been disclosed above.

The method for reconstructing a point of an octree node according to the embodiments may increase the compression efficiency of partially encoded/decoded geometry for spatial scalability depending on where the reconstructed position of the geometry.

Accordingly, according to the present disclosure, a geometry compression method for providing the spatial scalability function of a geometry-based point cloud compression (G-PCC) encoder/decoder for compressing 3D point cloud data may be provided, and the geometry compression efficiency may be increased.

The method/device (transmission method/device and/or reception method/device) according to the embodiments may provide various geometry position reconstruction methods for spatial scalability, thereby efficiently encoding/decoding various types of point cloud data.

As geometry position reconstruction methods and a signaling method for spatial scalability are provided according to the above-described embodiments, the point cloud data transmission/reception method/device according to the embodiments may reconstruct the position of a point based on an octree to provide the spatial scalability function, thereby increasing the geometry compression efficiency.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method for receiving point cloud data by a receiving apparatus, the method comprising:
receiving a bitstream including point cloud data;
decoding geometry data of the point cloud data partially,
wherein the decoded geometry data is represented based on an octree, and
wherein a geometry position of a node in a level of the octree is reconstructed based on a center position of the node for spatial scalability at the level of Levels of Detail (LoDs) of the octree that are skipped from a bottom of the octree; and
decoding attribute data of the point cloud data based on the reconstructed geometry position.

2. The method of claim 1,
wherein a first node of the octree is reconstructed based on a center position of the first node,
wherein a second node of the octree is reconstructed based on a center position of the second node, and
wherein the first node and the second node are not a leaf node of the octree.

3. An apparatus for receiving point cloud data, the apparatus comprising:
a receiver configured to receive a bitstream including point cloud data;
a decoder configured to:
decode geometry data of the point cloud data partially,
wherein the decoded geometry data is represented based on an octree, and
wherein a geometry position of a node in a level of the octree is reconstructed based on a center position of the node for spatial scalability at the level of Levels of Detail (LoDs) of the octree that are skipped from a bottom of the octree; and
decode attribute data of the point cloud data based on the reconstructed geometry position.

4. The apparatus of claim 3,
wherein a first node of the octree is reconstructed based on a center position of the first node,
wherein a second node of the octree is reconstructed based on a center position of the second node, and
wherein the first node and the second node are not a leaf node of the octree.

5. A method for transmitting point cloud data, the method comprising:
encoding geometry data of point cloud data,
wherein the encoded geometry data is represented based on an octree, and
wherein a node in a level of the octree is reconstructed based on a center position of the node for spatial scalability at the level of Levels of Detail (LoDs) of the octree that are skipped from a bottom of the octree;
encoding attribute data of the point cloud data based on the reconstructed geometry position; and
transmitting a bitstream including the geometry data and the attribute data of the point cloud data.

6. The method of claim 5,
wherein a first node of the octree is reconstructed based on a center position of the first node,
wherein a second node of the octree is reconstructed based on a center position of the second node, and
wherein the first node and the second node are not a leaf node of the octree.

7. An apparatus for transmitting point cloud data, the apparatus comprising:
encoding geometry data of point cloud data,
wherein the encoded geometry data is represented based on an octree, and
wherein a geometry position of a node in a level of the octree is reconstructed based on a center position of the node for spatial scalability at the level of Levels of Detail (LoDs) of the octree that are skipped from a bottom of the octree;
encoding attribute data of the point cloud data based on the reconstructed geometry position; and
transmitting a bitstream including the geometry data and the attribute data of the point cloud data.

8. The apparatus of claim 7,
wherein a first node of the octree is reconstructed based on a center position of the first node,
wherein a second node of the octree is reconstructed based on a center position of the second node, and
wherein the first node and the second node are not a leaf node of the octree.

* * * * *